US011063748B2

(12) United States Patent
Hornquist Astrand et al.

(10) Patent No.: US 11,063,748 B2
(45) Date of Patent: Jul. 13, 2021

(54) SYNCHRONIZING CONTENT

(71) Applicant: Apple Inc., Cupertino, CA (US)

(72) Inventors: Per Love Hornquist Astrand, Santa Clara, CA (US); Benjamin I. Williamson, San Jose, CA (US); Keaton F. Mowery, Redwood City, CA (US); Mitchell D. Adler, Los Gatos, CA (US); Michelle A. Auricchio, San Francisco, CA (US); Luke T. Hiesterman, San Francisco, CA (US)

(73) Assignee: Apple Inc., Cupertino, CA (US)

(\*) Notice: Subject to any disclaimer, the term of this patent is extended or adjusted under 35 U.S.C. 154(b) by 302 days.

(21) Appl. No.: 15/996,403

(22) Filed: Jun. 1, 2018

(65) Prior Publication Data

US 2018/0352031 A1 Dec. 6, 2018

Related U.S. Application Data

(60) Provisional application No. 62/514,895, filed on Jun. 4, 2017.

(51) Int. Cl.
*H04L 9/08* (2006.01)
*H04L 29/08* (2006.01)
(Continued)

(52) U.S. Cl.
CPC .......... *H04L 9/0819* (2013.01); *H04L 9/0822* (2013.01); *H04L 9/0825* (2013.01); *H04L 9/0833* (2013.01); *H04L 9/0891* (2013.01); *H04L 9/14* (2013.01); *H04L 9/30* (2013.01); *H04L 63/045* (2013.01);
(Continued)

(58) Field of Classification Search
CPC ... H04L 67/104; H04L 63/045; H04L 63/126; H04L 9/0822; H04L 9/0833; H04L 9/0891; H04L 9/0825; H04L 67/1044; H04L 67/1095; H04L 9/14; H04L 9/30;
(Continued)

(56) References Cited

U.S. PATENT DOCUMENTS 6,351,536 B1 2/2002 Sasaki
7,840,487 B2 11/2010 Hatano
(Continued)

*Primary Examiner* — Huan V Doan
(74) *Attorney, Agent, or Firm* — Morgan, Lewis & Bockius LLP

(57) ABSTRACT

Some embodiments of the subject technology provide a novel system for synchronizing content items among a group of peer devices. The content synchronizing system of some embodiments includes the group of peer devices and a set of one or more synchronizing servers communicatively connected with the peer devices through one or more networks. In some embodiments, the synchronizing system uses a star architecture, in which each peer device offloads its synchronization operations to the synchronizing server set. Without establishing a peer-to-peer communication with any other peer device, the particular peer device in these embodiments supplies an encrypted content item set along with the N−1 encryptions of a content key used to encrypt the content item set to the synchronizing server set so that this server set can distribute the encrypted content item set and an encrypted content key to each of the N−1 peer devices.

20 Claims, 15 Drawing Sheets

(51) Int. Cl.
*H04L 9/30* (2006.01)
*H04W 12/06* (2021.01)
*H04L 29/06* (2006.01)
*H04W 56/00* (2009.01)
*H04L 9/14* (2006.01)
*H04L 9/32* (2006.01)

(52) U.S. Cl.
CPC .......... *H04L 63/0442* (2013.01); *H04L 63/08* (2013.01); *H04L 63/126* (2013.01); *H04L 67/104* (2013.01); *H04L 67/1044* (2013.01); *H04L 67/1095* (2013.01); *H04W 12/06* (2013.01); *H04W 56/001* (2013.01); *H04L 9/3247* (2013.01)

(58) Field of Classification Search
CPC ... H04L 63/0442; H04L 9/0819; H04L 63/08; H04W 56/001; H04W 12/06
See application file for complete search history.

(56) References Cited

U.S. PATENT DOCUMENTS

| | | | |
|---|---|---|---|
| 8,433,755 B2 * | 4/2013 | Garcia, Jr. | H04L 65/403 |
| | | | 709/204 |
| 8,553,887 B2 | 10/2013 | Hong | |
| 8,863,227 B2 | 10/2014 | Zhang | |
| 9,374,373 B1 * | 6/2016 | Chan | H04L 9/0819 |
| 9,641,488 B2 | 5/2017 | Mityagin | |
| 10,149,156 B1 | 12/2018 | Tiku | |
| 2003/0217288 A1 | 11/2003 | Guo | |
| 2004/0064568 A1 | 4/2004 | Arora | |
| 2004/0249817 A1 | 12/2004 | Liu | |
| 2005/0015471 A1 | 1/2005 | Zhang | |
| 2005/0193199 A1 | 9/2005 | Asokan | |
| 2006/0067249 A1 | 3/2006 | Poustchi | |
| 2008/0046745 A1 | 2/2008 | Buch | |
| 2010/0290627 A1 | 11/2010 | Tsuji | |
| 2011/0026714 A1 | 2/2011 | Thomas | |
| 2013/0283175 A1 | 10/2013 | Faridian | |
| 2014/0189362 A1 | 7/2014 | Van Den Broeck | |
| 2014/0281514 A1 | 9/2014 | Erofeev | |
| 2014/0289528 A1 * | 9/2014 | Baghdasaryan | H04L 63/20 |
| | | | 713/171 |
| 2014/0351586 A1 | 11/2014 | Hook | |
| 2014/0380353 A1 | 12/2014 | Barton | |
| 2015/0095648 A1 | 4/2015 | Nix | |
| 2015/0358297 A1 * | 12/2015 | Endahl | H04L 9/14 |
| | | | 713/168 |
| 2016/0150031 A1 | 5/2016 | Knowles | |
| 2017/0054674 A1 | 2/2017 | Moffat | |
| 2017/0111172 A1 | 4/2017 | Sprenger | |
| 2018/0124029 A1 | 5/2018 | Zibuschka | |
| 2018/0124129 A1 | 5/2018 | Geisler | |
| 2018/0189369 A1 * | 7/2018 | Baek | G06F 16/2358 |
| 2019/0073175 A1 * | 3/2019 | Mohammad | H04L 63/0428 |
| 2019/0087432 A1 | 3/2019 | Sion | |
| 2020/0012763 A1 | 1/2020 | Arngren | |

* cited by examiner

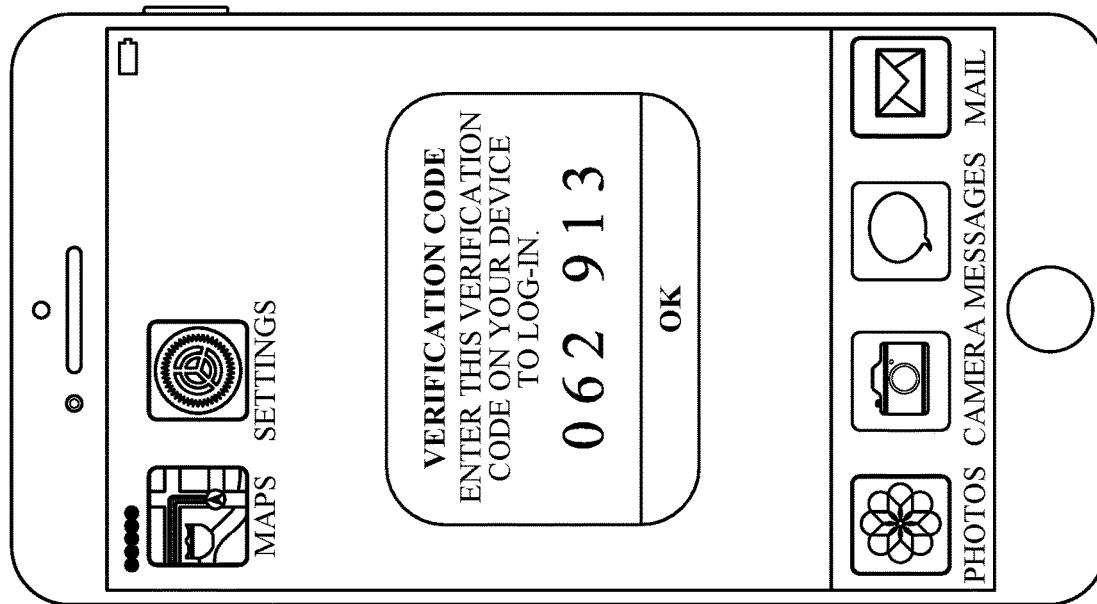
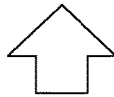
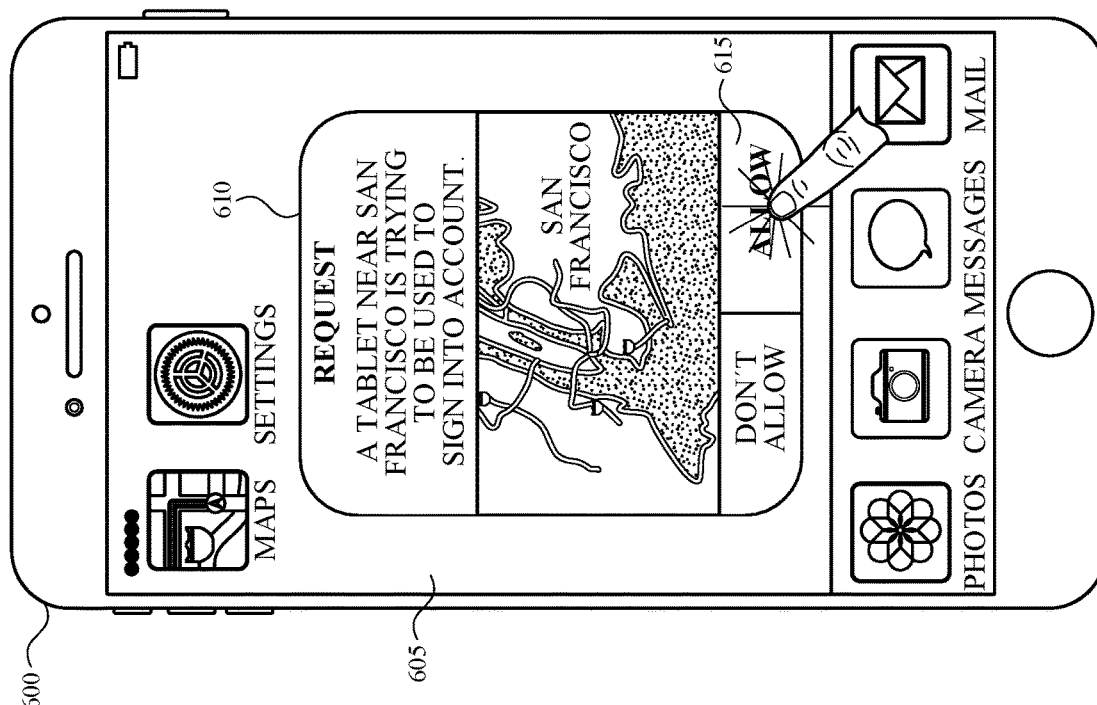
FIG. 6

```
1300

{ } — Dictionary
                                                    [ ] — Array }
    policyVersion: 1,
    modelToCategory:   [  ← 1305
        { prefix:    "PhoneX",    category:    "full" },
        { prefix:    "TabletY",   category:    "full" },
        { prefix     "LaptopZ",   category:    "full" },
        { prefix     "ComputerA", category:    "full" },
        { prefix:    "MSD",    ',  category:    "tv" },
        { prefix:    "Watch",     category:    "watch" }
    ],
    categoriesByView:   }  ← 1310
        "WiFi":   [ "full", "tv", "watch" ],
        "SafariCreditCards":  [ "full" ],
        "PCSEscrow":  [ "full" ]
    },
    introducersByCategory:   }  ← 1315
        "full":   [ "full", "tv", "watch" ],
        "tv":   [ "tv" ],
        "watch":   [ "watch" ]
    },
    redactions:   }  ← 1320
        "foo":   "dbf75HJKDfjkdhsFJB6dfGDFKLD5678vd...",
        "bar":   "453ghjcy534tuSJKDvbvmn35ghj345ghv..."
    }
}
```

*FIG. 13*

SYNCHRONIZING CONTENT

CROSS-REFERENCE TO RELATED APPLICATIONS

The present application claims the benefit of U.S. Provisional Patent Application Ser. No. 62/514,895, entitled "Synchronizing Content," filed on Jun. 4, 2017, which is hereby incorporated by reference in its entirety for all purposes.

TECHNICAL FIELD

The present description relates generally to synchronizing content, including synchronizing content between multiple devices.

BACKGROUND

Sharing data among multiple devices is an increasingly popular feature for users of multiple devices. The data-sharing feature is implemented by updating entire files and, in some cases, entire sets of files specified for synchronizing among the multiple devices. Many applications that provide a data-sharing feature may send and receive the data among the multiple devices in an unprotected manner.

BRIEF DESCRIPTION OF THE DRAWINGS

Certain features of the subject technology are set forth in the appended claims. However, for purposes of explanation, several embodiments of the subject technology are set forth in the following figures.

FIG. 6 illustrates one exemplary process through which a first device adds a second device to a circle of peer devices associated with an account.

FIG. 13 illustrates an example of a policy document used in some embodiments of the subject technology.

DETAILED DESCRIPTION

Figure 1:
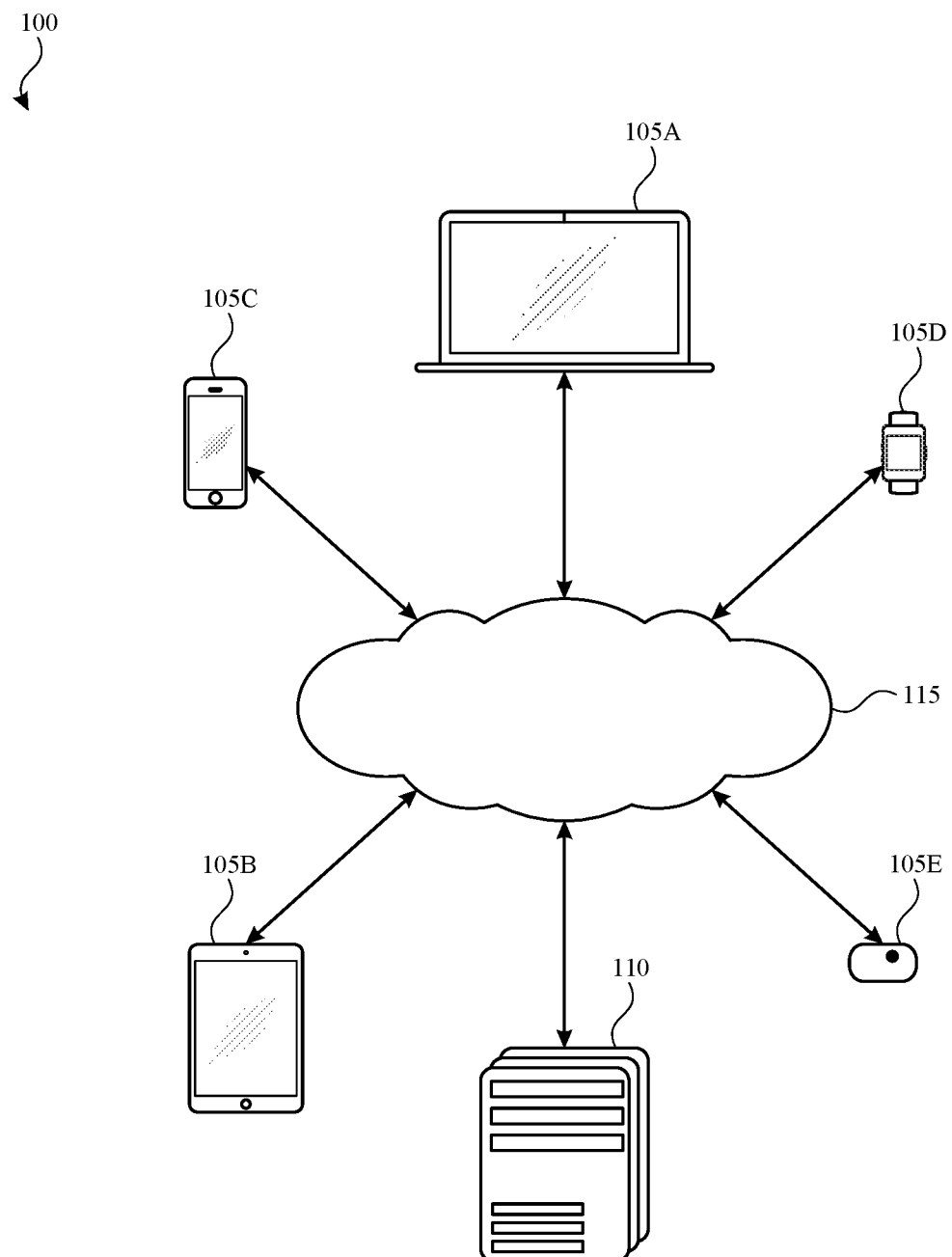
FIG. 1 illustrates an example of the content synchronizing system of some embodiments.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Some embodiments of the subject technology provide a novel system for synchronizing content items among a group of peer devices. The synchronized content items in some embodiments can include passwords, keys, certificates, and secure notes, while in other embodiments, they can also include other types of content, such as audio content, image content, video content, document content, learned behaviors (e.g., learned keystroke entries), learned locations (e.g., locations of the devices), etc.

The content synchronizing system of some embodiments includes the group of peer devices and a set of one or more synchronizing servers communicatively connected with the peer devices through one or more networks. In some embodiments, the synchronizing system uses a star architecture, in which each peer device offloads its synchronization operations to the synchronizing server set. As the central synchronizing node, the server set in these embodiments receives new or modified content items from the peer devices and distributes these content items to other peer devices.

For example, when a particular peer device creates or modifies a set of one or more content items that need to be supplied to N peer devices in a peer group (where N is an integer larger than 1), the particular peer device in some embodiments encrypts the content item set with a content key, and generates N−1 encryptions of the content key with N−1 public keys of the N−1 other peer devices (or peers). In some embodiments, the content key is a highest-level symmetric key that is stored on the particular device for the content items in the content item set. Each peer's encrypted content key allows the peer to use the content key (once decrypted by the peer) to decrypt the content item set.

Without establishing a peer-to-peer communication with any other peer device, the particular peer device in these embodiments supplies the encrypted content item set along with the N−1 encryptions of the content key to the synchronizing server set so that this server set can distribute the encrypted content item set and an encrypted content key to each of the N−1 peer devices. The particular device in some embodiments encrypts the content key by encrypting the key itself, while in other embodiments, it encrypts the content key by encrypting an identifier, which once decrypted by another peer device, allows the other peer device to derive the content key or to identify the content key from several content keys stored on the other peer device.

The synchronizing system distributes modifications to a content item set differently in different embodiments. In some embodiments, the peer that modifies a content item set (e.g., adds a content item, removes a content item, or replaces a content item), provides the entire content item set to the synchronizing server set, which then distributes the entire content set to each other peer device that should receive it. In other embodiments, the peer that modifies the content item set, only provides new content item(s) or modified content item(s) (i.e., item(s) that replaced previous content item(s)) to the server set, which, in turn, only distributes the new or modified item(s) to the other peer devices. In these embodiments, the content item set's identifier is used to identify the content item set associated with the new or modified item(s).

In some of these embodiments, the synchronizing server set also stores a backup copy of the content item set for each peer device. For instance, in the above-mentioned example, the particular device in some embodiments generates an Nth encrypted content key using its own public key (i.e., the public key of the particular device), and supplies this encrypted key to the synchronizing server set to store with the encrypted content item set as a backup for the particular peer device. Similarly, in some of these embodiments, the synchronizing server set stores the encrypted key for each of the other N−1 peer devices along with the encrypted content item set so that any of these devices can retrieve the encrypted content item set and its encryption key.

A peer device in some embodiments creates the encrypted content item sets and encrypted keys after modifying or creating the content item sets, even when the peer device does not have a network connection to the synchronizing server set. In these embodiments, the peer device stores the encrypted content item sets and encrypted keys until such time that it has a network connection to the synchronizing server set, at which time it uploads its encrypted content and keys to the synchronizing server set.

In some embodiments, each time a particular peer device creates or modifies a content item set, and provides this set to the synchronizing server set, the particular device also generates a version manifest for the content item set. The version manifest includes a version identifier (e.g., a version number) that (1) identifies an edit version associated with the content item set, (2) identifies each new or modified content item in the content item set that is provided with the version manifest, and (3) when one or more prior version manifests were previously defined, identifies at least one prior version manifest associated with the content item set.

After generating a version manifest, the particular device signs the version manifest (e.g., by using its private key) and supplies this signature with the version manifest to the synchronizing server set. Each peer device authenticates the version manifest's signature (e.g., by using the public key of the particular device that created the manifest) in order to authenticate the source of the version manifest and its associated content item set. In this manner, the version manifests are used in some embodiments to ensure that only peer devices within a group can add, modify or delete content items in a content item set. For instance, in some embodiments, each time a peer device receives a new or modified content item set, the peer devices authenticates the signature to make sure that one of its peer devices created the content item set, or added, modified or deleted content items in the content item set.

The version manifest also allows the other peer devices to identify correct content items in the content item set when the peer devices in the group make multiple changes to the content items. When multiple devices make multiple changes rapidly to the same content item set, one device might modify the content item set before receiving the modifications to the same content item set by another peer device. To account for such situation, each peer device that modifies the content item set generates a version manifest that refers to earlier version manifests for the same content item set. Other peer devices can then use references to earlier manifests by later manifests in order to select between two different versions (e.g., two different values) that are defined at two different times and/or by two different peers for one content item in the content item set. When two or more manifests from two or more peers have conflicting updates for one content item in the set, each peer in some embodiments will have to pick one manifest as the latest manifest, and then will update the content item set according to the picked manifest. In some embodiments, each peer will pick the manifest (1) that the peer received last and (2) that refers to the most up to date set of prior version manifests. Other embodiments use other criteria for the peers to pick one manifest between two conflicting manifests.

After receiving a created or modified content item set from a particular peer device, the synchronizing server set has to identify the other peer devices in the group of peers associated with the particular peer device, and to provide the content item set to each of the identified peer devices. For a new content item set, the particular peer device in some embodiments provides a peer list identifier that identifies the peers to which the content item set should be distributed.

Also, in some embodiments, the particular peer device provides such a peer list identifier when the particular device modifies a content item set.

In some embodiments, a peer device can define a peer list when it accepts a peer device in a group of peers, or it can refer to a peer list previously defined by another peer device. Specifically, in some embodiments, one peer device in a group can accept another peer device into the group. In some of these embodiments, when a first peer device accepts a second peer device into a group of peer devices, the first peer device in some embodiments creates a first list of peer devices that identifies each device in the group including the first and second device. The first device then transmits the first peer list to the synchronizing server set to store.

In some embodiments, the synchronizing server set can store multiple lists of peer devices that have been created at different times for a group of peers. Accordingly, when the synchronizing server set receives the first peer list, the server set might have previously stored one or more other peer lists, which include the first peer device, to define a group of peer devices. For instance, in some cases, the synchronizing server set might have previously stored a second peer list that the first peer device or another peer device previously defined for the same set of content items. After receiving the first peer list, the synchronizing server set distributes the first peer list to the other peer devices in the peer group with the first device, or otherwise makes this list available to these peer devices.

Each other peer device in the group can then examine the first list to determine whether the peer should identify this list as a list that appropriately identifies the peer's group of peers. For instance, in the above example, when a third peer device previously used the second peer list to identify its peer group, the third peer would examine the first peer list that it subsequently receives from the synchronizing server set to determine whether it should select the first peer list or the second peer list as the list that defines the peers in its group of peers. If the third peer selects the first peer list, it provides a reference to the first peer list to the synchronizing server set, which then stores this reference as an indication to the other peer devices that the third peer has selected the first peer list as the list that correctly identifies the peers in the group.

For the first peer list, the first device in some embodiments generates a signature (e.g., by using its private key) that authenticates the first peer list as a list that was generated by a legitimate peer device. The first device transmits the signature to the synchronizing server set to store along with the first peer list so that other peer devices can use the signature (e.g., in conjunction with the first device's public key) to identify the first peer list as a list authenticated by the first device. In some embodiments, the first device defines the first peer list to include an identifier for each peer that it designates to be in the group, generates a list identifier for the first list from the peer identifiers (e.g., by computing a hash value from the peer identifiers), and then generates the signature for the first list by signing the list identifier (e.g., with its private key).

In some embodiments, the synchronizing server set stores each peer list that it receives from each peer device as an immutable object that can be referred to by other peer devices. For instance, as mentioned above, the third device in the example above can select the first device's first peer list by providing to the synchronizing server set a reference to the first list, and the server set stores this reference as an indication to the other peer devices that the third device has identified the first peer list as the list that accurately identifies the peers in the group of peer devices. The third device's reference to the first list is the list identifier for this list that has been signed by the third device (e.g., signed by the third device's private key).

As an immutable object, no peer list stored by the server set can be modified by any peer device in the peer group or by the server set. In other words, no peer device can be added or removed from a previously defined peer list. To add or remove a peer device in a previously defined peer list, a peer device (like the first peer device in the above example) would have to define a new peer list that is similar to the previously defined peer list except for the added or removed peer device. Other than storing a peer list from one peer device, the synchronizing server set in some embodiments only (1) can add or delete references to the peer list by other peer devices when the other peer devices select the peer list, and (2) can delete a peer list when no peer device identifies this list as the list that correctly identifies the group of peers for that device.

In some embodiments, a peer device can define its peer list by reference to a set of devices "included" in its peer group and a set of devices "excluded" from its peer group. The peer device in some embodiments generates (e.g., computes a hash of) the peer list identifier for a peer list from peer identifiers of peers in both the included set and excluded set (if any) of peers of the list. In other embodiments, the peer list identifier is generated (e.g., is computed as a hash of) only from the peer identifiers of the peers in the included set of peers of the list.

Also, when a first peer device puts a second peer device on a peer list as a peer excluded from a peer group, the first peer device in some embodiments will not add the second peer device to another peer list as a peer included in the peer group unless the second peer device generates a new peer identifier for itself. Also, in some embodiments, the peer identifier of a device include an epoch period number that serves as a form of quantized temporal value that identifies a time period during which the device was added to a peer group. In some embodiments, when a device tries to join a peer group, it generates a peer identifier that includes an epoch period number that is equal to or greater than the epoch period number of any other device in the group. Also, in some embodiments, a first device cannot add a second device to the peer group when the first device has an epoch period number that is less than the second device's epoch period number by a certain amount (e.g., two or more epoch numbers).

In some embodiments, each peer group includes devices that have some association with each other (e.g., are associated with an account or a user). Also, the synchronization system of some embodiments defines different sets of peers in a peer group because not all of the content items should be synchronized with all peer devices. For instance, in some embodiments, some devices in a peer group are more secure than other devices in a peer group (e.g., the more secure devices have secure enclave processors that store the private keys very securely, etc.), and the more secure devices are given access to a larger set of content items.

To address this, the synchronization system in some embodiments allows multiple peer sets to be defined for one peer group, so that different content item sets can be associated with different sets of peer devices. Under this approach, each content item set defines a "view" of items to be synchronized among a "circle" of peer devices. Each circle is a list of peer devices, and for one view, different peer devices might identify different circles during a circle update. For such embodiments, one peer device might accept another peer device for one or more of its circles by providing one or more lists of peers to the server set to distribute to the other peer devices. Also, in some embodiments, each new or modified content item set from one particular peer is distributed to one or more peers included in the particular peer's circle that is associated with the content item set.

FIG. 1 illustrates an example of the synchronization system 100 of some embodiments. As shown, this system includes several peer devices 105a-e and a set of one or more synchronizing servers 110. The peer devices in this example include a computer 105a, a tablet 105b, a smartphone 105c, a smart watch 105d, and a streaming device 105e. These peer devices communicatively connect with the synchronizing server set 110 through a network 115. The network 115 can include one or more local area networks, one or more wide area networks, one or more wireless carrier networks and/or the Internet.

In some embodiments, the synchronizing server set provides a cloud-based content synchronization service to distribute sets of content items among different groups of peer devices. Each peer group includes devices that are associated with each other. For instance, in some embodiments, different peer groups are associated with different accounts and/or different users.

Figure 2:
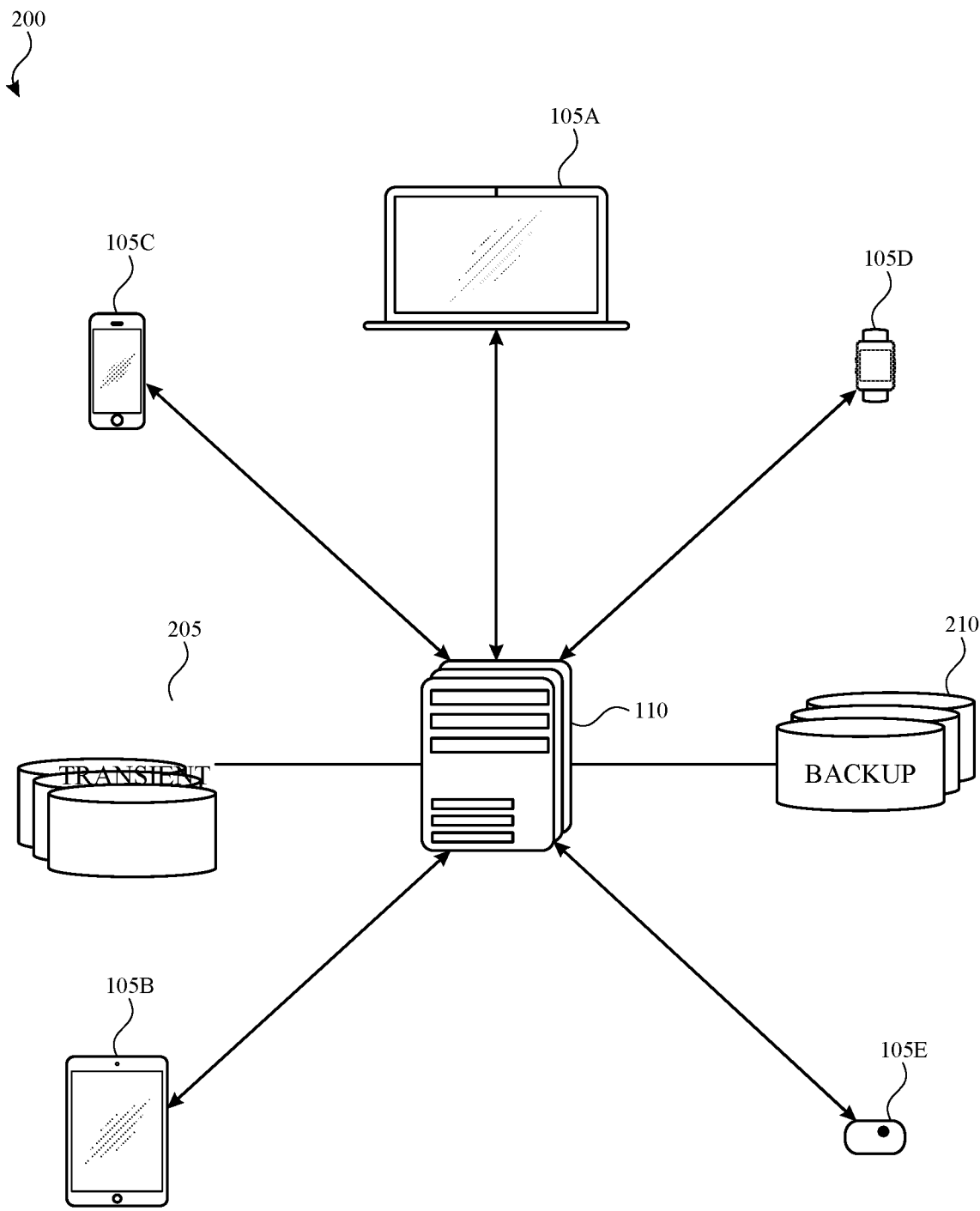
FIG. 2 illustrates that in some embodiments, the synchronization system uses a star architecture.

FIG. 2 illustrates that in some embodiments, the synchronization system 100 uses a star architecture 200. In this architecture, each peer device offloads its synchronization operations to the synchronizing server set 110. As further described below, each peer device in some embodiments provides new or modified content items sets for the other peer devices to the server set 110 in an encrypted manner that only allows the other peer devices to decrypt the content.

For instance, in some embodiments, the peer device encrypts each content item with a content key and generates multiple encrypted copies of the content key, with each encrypted content key being encrypted with a public key of a different peer device that should receive the content item set. Each peer's encrypted content key allows the peer to use the content key (once decrypted by the peer) to decrypt the content item set. In other embodiments, the peer device encrypts the content item set in its entirety with the content key. In yet other embodiments, the peer device uses other encryption schemes to encrypt the content items in a manner that only allows the other peer devices to decrypt the content items.

As a central synchronizing node, the server set 110 in some embodiments receives a new or modified content item from a particular peer device along with the encrypted content keys, and distributes the content item set and one encrypted content key to each other peer device in the group. The synchronizing system 100 distributes modifications to the content item set differently in different embodiments. In some embodiments, the peer that modifies a content item set (e.g., adds a content item, removes a content item, or replaces a content item), provides the entire content item set to the server set, which then distributes the entire content set to each other peer device that should receive it. In other embodiments, the peer that modifies the content item set, only provides new content item(s) or modified content item(s) (i.e., item(s) that replaced previous content item(s)) to the server set 110, which, in turn, only distributes the new or modified item(s) to the other peer devices. In these embodiments, the content item set's identifier is used to identify the content item set associated with the new or modified item(s).

When the server set 110 receives the new or modified content item set from the particular peer device, one or more of the other peer devices might be offline, i.e., they might not be communicatively connected to the server set (e.g., they might be off or have no network connection). To handle distribution of content for such an offline peer, the server set 110 has a set of transient storages 205 in which it stores the new or modified encrypted content item set along with the encrypted content key for the offline peer, until the server set can communicatively connect to the offline peer to provide the content item set and content key.

In some embodiments, the server set 110 also has one or more backup storages 210 in which it stores backup copies of the content item sets and the encrypted content key for each peer device. For each peer device, the backup content items set(s) in some embodiments can be content provided by the peer device to the server set 110 or provided by other peer devices to the server set. In other embodiments, the server set 110 does not have backup storages 210 as it does not store backup copies of content items for the peers.

Figure 3:
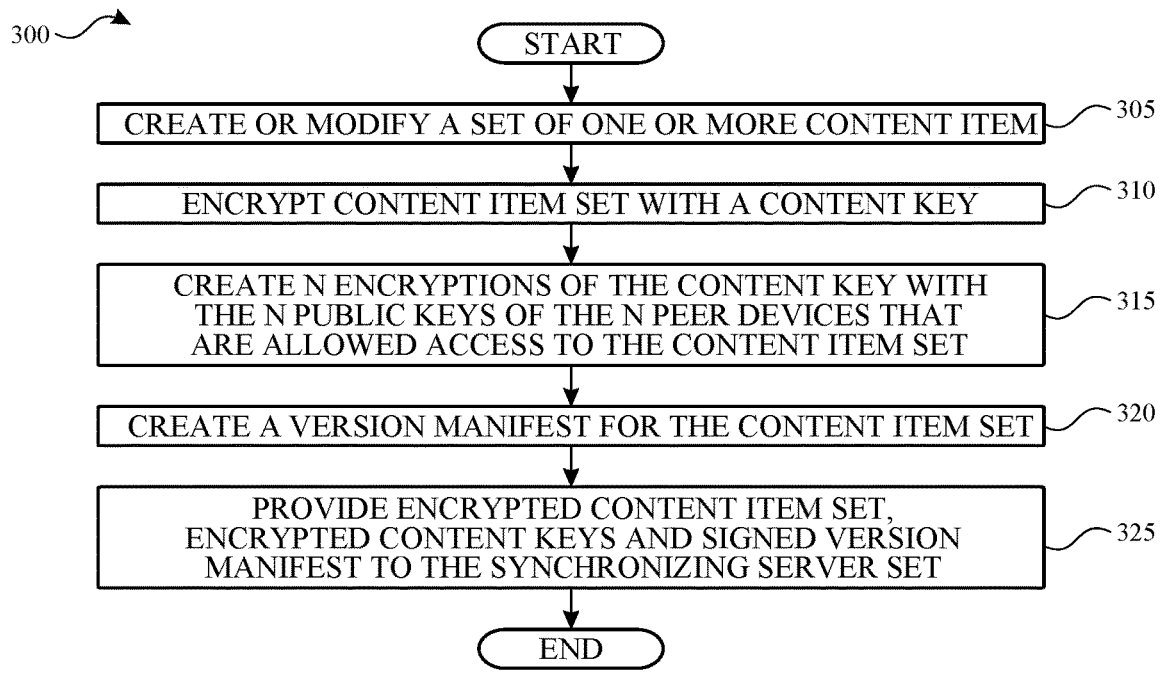
FIG. 3 illustrates a process that a particular peer device performs when it has created or modified a content item set.

FIG. 3 illustrates a process 300 that a particular peer device performs when it has created or modified a content item set. As shown, the process starts (at 305) with the particular peer device creating a new set of one or more content items, or modifying a previously defined set of one or more content items. This peer device can be a desktop computer, a laptop computer, a tablet, a smartphone, a smart watch, a streaming device, etc. Also, the content items in the set can be passwords, keys, certificates, and secure notes in some embodiments. In other embodiments, the content items can also include other types of content, such as audio content, image content, video content, document content, learned behaviors (e.g., learned keystroke entries), learned locations (e.g., locations of the devices), etc.

Next, at 310, the process 300 of the particular peer device encrypts the content item set with a content key. In some embodiments, the content key is a highest-level symmetric key that is stored on the particular device for the content items in the content item set. Thus, when the created/modified content item set has more than one content items, the particular peer device in these embodiments examines a key hierarchy (e.g., a key directed acyclic graph, DAG) to identify the high-level key that can be used for each content item in the content key set. In some embodiments, the particular peer device individually encrypts each content item in the set with the content key. In other embodiments, this device encrypts the content item set in its entirety with the content key.

At 315, the process then generates N encryptions of the content key with N public keys of the N peer devices that can access the content items in the set of content items. The N peer devices include the particular peer device. Thus, for the Nth encryption of the content key that is associated with the particular peer device, the process 300 encrypts the content key with the particular peer device's public key. The Nth copy of the content key is for the synchronizing server set to store with the backup copy of the content item set that this server set maintains for the particular peer device. In the embodiments in which the server set does not perform this backup operation, the particular peer device just generates (at 315) N−1 encryptions of the content key with N−1 public keys of the N−1 other peer devices that can access the created or modified content item set.

At 315, the particular device in some embodiments encrypts the content key by encrypting the key itself. In other embodiments, the particular peer device encrypts the content key by encrypting a key identifier or seed, which once decrypted by another peer device, allows the other peer device to identify the content key from several content keys stored on the other peer device, or to derive the content key.

Next, at 320, the process creates a version manifest for the created/modified content item set. In some embodiments, each time a particular peer device creates or modifies a content item set, the particular device also generates a version manifest for the content item set. The version manifest includes a version identifier (e.g., a version number) that identifies an edit version associated with the content item set. The version manifest also identifies each new or modified content item in the content item set that is provided with the version manifest. When a prior version manifest was previously defined for this content item set, the version manifest of the process 300 also includes a reference to at least one prior version manifest.

The process 300 signs (at 320) its version manifest, e.g., by using the private key of the particular peer device that performs the process 300. This signature will be supplied to the synchronizing server set along with the version manifest. As mentioned further below, the synchronizing server set in some embodiments will distribute the version manifest along with its signature and the encrypted content and content keys to the other peer devices that have access to the created/modified content item set. Each peer device in some embodiments then uses the version manifest to authenticate the content item set and to reconcile a received content item set with any previous version of this set that it may have received.

More specifically, each peer device authenticates the version manifest's signature (e.g., by using the public key of the particular peer device) in order to authenticate the version manifest and its associated set of content items. In this manner, the version manifests are used in some embodiments to ensure that only peer devices within a group can add, modify or delete content items in a content item set. In other words, each time a peer device in some embodiments receives a new or modified content item set, the peer devices authenticates the signature to make sure that one of its peer devices created the content item set, or added, modified or deleted content items in the content item set.

As mentioned above, the version manifest also allows the other peer devices to identify correct content items in the content item set when the peer devices in the group make multiple changes to the content items. When multiple devices make multiple changes rapidly to the same content item set, one device might modify the content item set before receiving the modifications to the same content item set by another peer device. To account for such situation, each peer device that modifies the content item set generates a version manifest that refers to earlier version manifests for the same content item set. Other peer devices can then use references to earlier manifests by later manifests in order to select between two different versions (e.g., two different values) that are defined at two different times and/or by two different peers for one content item in the content item set. When two or more manifests from two or more peers have conflicting updates for one content item in the set, each peer in some embodiments will have to pick one manifest as the latest manifest, and then will update the content item set according to the picked manifest. In some embodiments, each peer will pick the manifest (1) that the peer received last and (2) that refers to the most up to date set of prior version manifests. Other embodiments use other criteria for the peers to pick one manifest between two conflicting manifests. Version manifests will be further described below.

Without establishing a peer-to-peer communication with any other peer device, the process 300 of the particular peer device in some embodiments sends (at 325) to the synchronizing server set (1) the encrypted content item set, (2) the N encryptions of the content key, and (3) the signed version manifest (i.e., the manifest and its signature). The server set can then distribute the encrypted content item set and an encrypted content key to each of the N−1 peer devices, along with the signed version manifest.

In some embodiments, there can be a delay between the upload operation 325 of the process 300 and the other operations 305-320 of this process. This is because a peer device in some embodiments can create an encrypted content item set and encrypted keys after creating or modifying the content item set, even when the peer device does not have a network connection to the synchronizing server set. In these embodiments, the peer device stores the encrypted content item set and encrypted keys until such time that it has network connections with the synchronizing server set, at which time it uploads its encrypted content and keys to the synchronizing server set.

Figure 4:
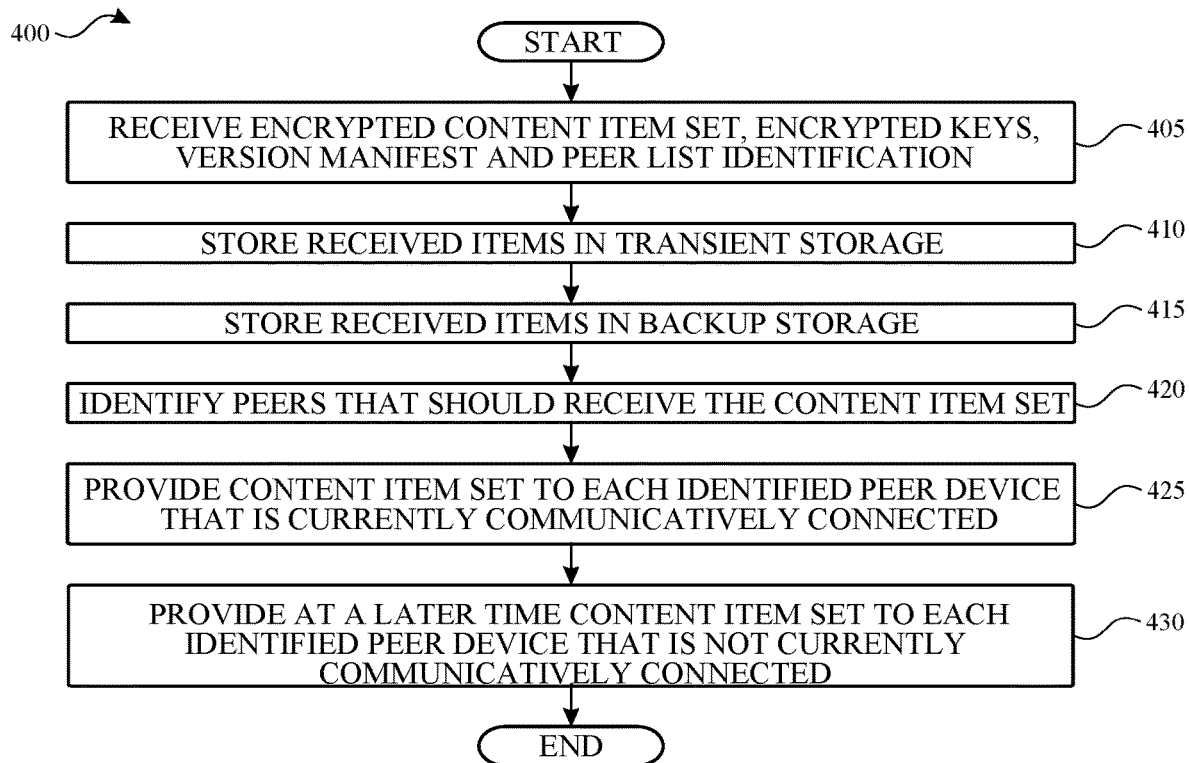
FIG. 4 conceptually illustrates a process that the server set performs whenever it receives a new or modified content item set from a particular device for distribution to its peer devices.

FIG. 4 conceptually illustrates a process 400 that the server set 110 performs whenever it receives a new or modified content item set from a particular device for distribution to its peer devices. This process will be explained by reference to FIG. 5, which illustrates an example of the tablet 105b sending an encrypted content item set with three encrypted content items 510, 515 and 520 to the synchronizing server set 110.

Figure 5:
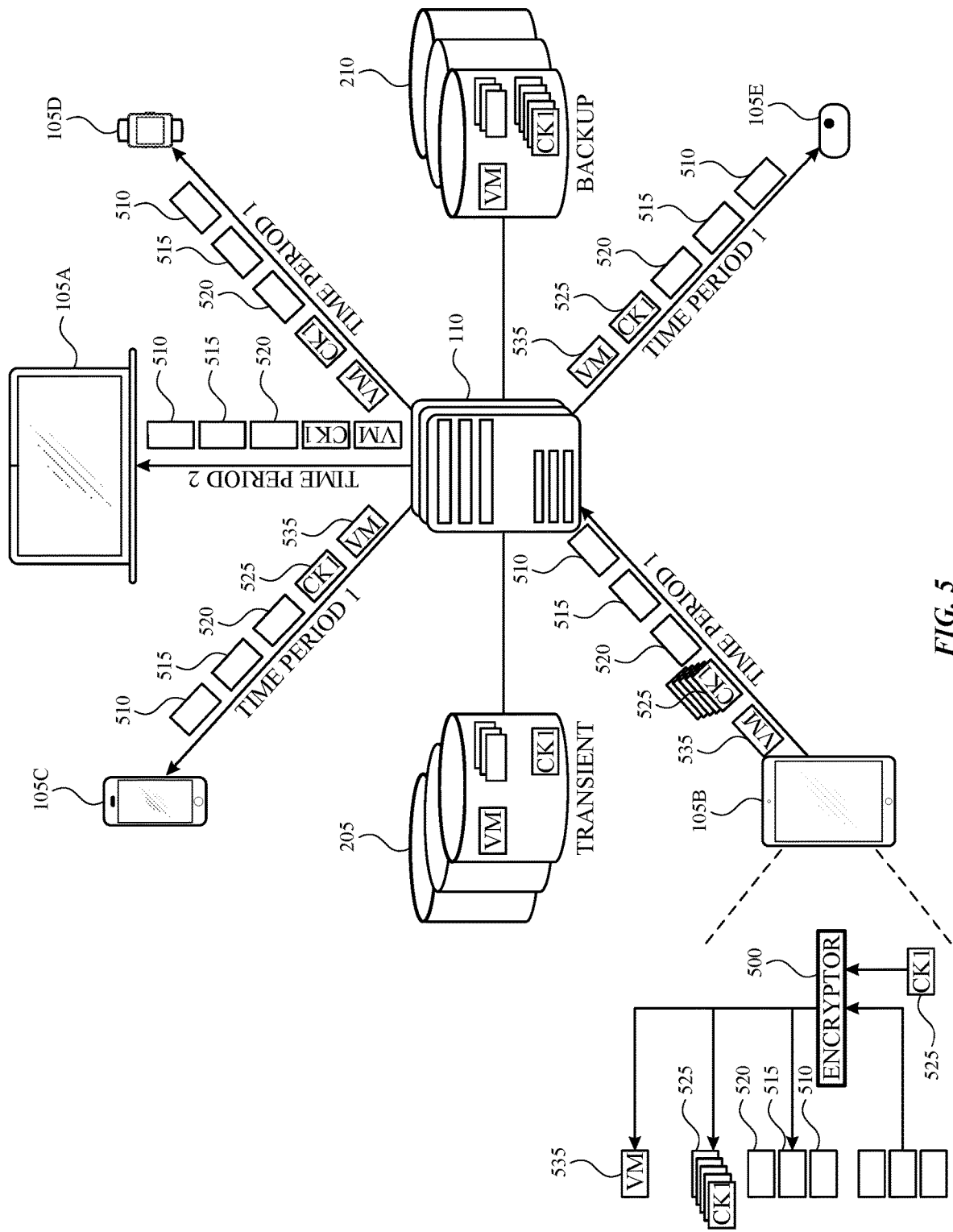
FIG. 5 illustrates an example of a tablet sending an encrypted content item set with three encrypted content items to the synchronizing server set.

As shown, the process 400 starts when the server set receives (at 405) a new encrypted content item set from the particular device along with several encrypted content keys and a signed version manifest. FIG. 5 illustrates an example of such encrypted content items, keys and version manifest. Specifically, it illustrates an encryptor 500 of the tablet 105b that encrypts three content items 510, 515 and 520 with a content key 525, and encrypts this content key five times for the five peer devices 105a-105e.

Each peer device's encrypted content key is encrypted with the public key of the device. The encryptor 500 conceptually represents a set of one or more encryption processes that the tablet 105b executes to encrypt content and content keys. In FIG. 5, the encrypted versions of the content items and content key are drawn with thicker lines to signify their encrypted status. The tablet 105b also generates a version manifest for the content item set, and generates a signature for this version manifest. The tablet 105b then sends the encrypted content item set (items 510, 515, and 520) to the server set 110 along with the five encrypted content keys 525 and the signed version manifest 535 (i.e., the version manifest and its signature) for this content item set.

At 410, the process 400 stores the received data in the transient storage 205 from where it forwards these items, keys and manifest to the other peer devices of the particular device. FIG. 5 shows the server set 110 storing the content item 510, 515, and 520, encrypted content keys 525 and the version manifest 535 in the transient storage 205. The server set stores these items for distribution to the laptop 105a, the smartphone 105c, the smart watch 105d and the streaming device 105e. Next, at 415, the process 400 stores the received items in the backup storage 210. In FIG. 5, the server set 110 stores in the backup storages 210 the encrypted content items 510, 515, and 520, the encrypted content keys 525 and version manifest 535 as backup copies for the peer devices 105a-105e.

At 420, the process 400 identifies each peer device of the particular device that should receive the encrypted content item set. With the encrypted content item set, the particular peer device in some embodiments provides a peer list identifier that identifies the list of peer devices that should receive the encrypted content item set. In some embodiments, the particular device can have multiple sets of content items that it synchronizes with multiple different sets of peer devices in the peer group. This is because in some of embodiments a particular device might have one or more peer devices that are not allowed to receive all types of content items that the particular device synchronizes with other devices. For example, a media streaming device might be allowed to receive one set of passwords (e.g., a Netflix password, a HULU password, etc.) but might not be allowed to receive another set of passwords (e.g., financial account passwords, etc.).

To address this, the synchronization system 100 in some embodiments allows multiple peer sets to be defined for one account or one user, so that different content item sets can be associated with different sets of peer devices. Under this approach, each content item set defines a "view" of items to be synchronized among a "circle" of peer devices. Each circle is a list of peer devices, and for one view, different peer devices might identify different circles during a circle update. In this approach, a group of associated peer devices (e.g., devices associated with one user account) can have multiple different sets of circles for different views. One item view can be synchronized to the same or to a different circle of peers as another item view in some embodiments.

Thus, with the content item set, the particular peer device in some embodiments provides a peer list identifier to the synchronizing server set 110, which then uses this identifier to identify (at 420) the list of peer devices that should receive the content item set. In the example of FIG. 5, the tablet 105b provides a peer list identifier that identifies the group of peer devices 105a-105e.

As further described below, the peer list in some embodiments has a set of "included" peer devices and a set of "excluded" peer devices. For these embodiments, the process 400 identifies (at 420) only the included peers (other than the particular peer device that provided the content item set) as peers that should receive the content item set. This process does not identify (at 420) any excluded peer as a peer that should receive the content item set because such a device has been excluded from receiving the content items from the included peers in the peer list.

At 425, the process 400 provides the encrypted content item set, an encrypted key and the version manifest to each identified peer device (identified at 420) that is currently communicatively connected with the synchronizing server set 110. These are identified peer devices with which the synchronizing server set 110 is currently in a communication session or identified peer devices with which the server set can establish a communication session.

In FIG. 5, the laptop 105a is offline during the first time period (Time Period 1) when the tablet 105b sends the encrypted content items, encrypted keys, and version manifest to the server set 110. However, the other peer devices 105c, 105d, and 105e however are communicatively connected with the server set 110 during this time period. Hence, during the first time period, the server set distributes the encrypted content items, an encrypted content key, and a version manifest to each of the peer devices 105c, 105d, and 105e.

At 430, the process 400 provides at a later time the encrypted content items, encrypted content key, and version manifest to each peer device that was offline at 425. FIG. 5 shows the server set distributing the encrypted content items 510, 515 and 520, an encrypted content key 525, and the version manifest 535 to the laptop 105a during a second time period (Time Period 2) when this laptop connects to the server set. As shown, the server set 110 stores the encrypted content items and key for the laptop 105a in the transient storage 205 while the laptop is offline (i.e., before the second time period).

In some embodiments, a particular peer device can create a peer list when it adds another peer device to a peer circle (e.g., a set of peers for a set of content items), or it can refer to a peer list previously defined by another peer device. When a first peer device adds a second peer device to a circle of peer devices, the first peer device in some embodiments creates a first peer list that identifies each device in the circle (including the first and second device), and transmits this list to the synchronizing server set to store.

In some embodiments, the synchronizing server set can store multiple lists of peer devices that have been created at different times for a group of peers. Accordingly, when the synchronizing server set receives the first peer list, the server set stores this list in a data storage structure (e.g., a database table) that stores any other peer list that was previously created for the group of peers by the first device or other devices in the group. As further described below, the synchronizing server set stores each peer list that it receives as an immutable object that can be referenced to by other peers in the group.

After receiving the first peer list, the synchronizing server set distributes the first peer list to the other peer devices in the group that can be part of the circle with the first device, or otherwise makes this list available to these peer devices. Each such peer device then examines the first peer list to determine whether the peer should identify this peer list as a list that appropriately identifies a peer circle for it. When one of the other peer device determines that it should identify the first list as the list that accurately identifies a peer circle for it, this other peer device provides a reference to the first list to the synchronizing server set, which then stores this reference as an indication to all the peer devices that this other peer device has selected the first list as the list that correctly identifies a peer circle for it.

FIGS. 6-10 illustrate how peer lists are created, stored and distributed in some embodiments. FIG. 6 illustrates one exemplary process through which a first device adds a second device to a circle of peer devices associated with an account. This process is described by reference to two operational stages 602 and 604 of a user interface (UI) of the first device. In this example, the first device is a smartphone 600 with a touch-sensitive display screen 605.

In the first stage 602, the first device's UI displays a prompt 610 that provides a notification that the second device is attempting to be associated with an account for which the synchronizing server set 110 synchronizes content among a group of peer devices. The first device gets this notification in some embodiments from the synchronizing server set 110 when the server set receives the correct account name and password from the second device, presumably because an authorized user wants to add the second device to the same peer group as the first device. The first stage 602 also shows a user selecting the Allow option 615 in the prompt 610 to accept the addition of the second device to the peer group.

The second stage 604 shows that after the selection of the Allow option 615, the first device 600 displays a code that the user has to enter on the second device in order to complete the addition of the second device to the first device's peer group. In some embodiments, the first device 600 generates this code. The user has to provide this code on the second device, which then forwards this code back to the first device through the synchronizing server set 110 in order for the first device to confirm this code.

Figure 7:
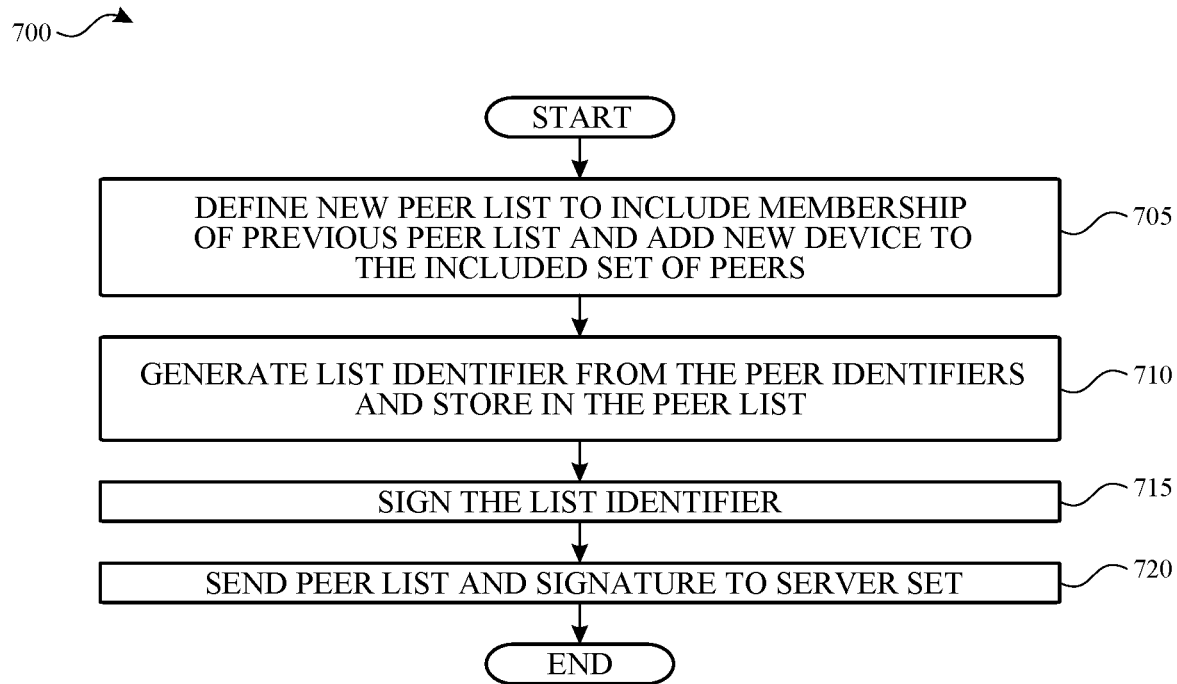
FIG. 7 conceptually illustrates one such process for some embodiments of the subject technology.
Figure 8:
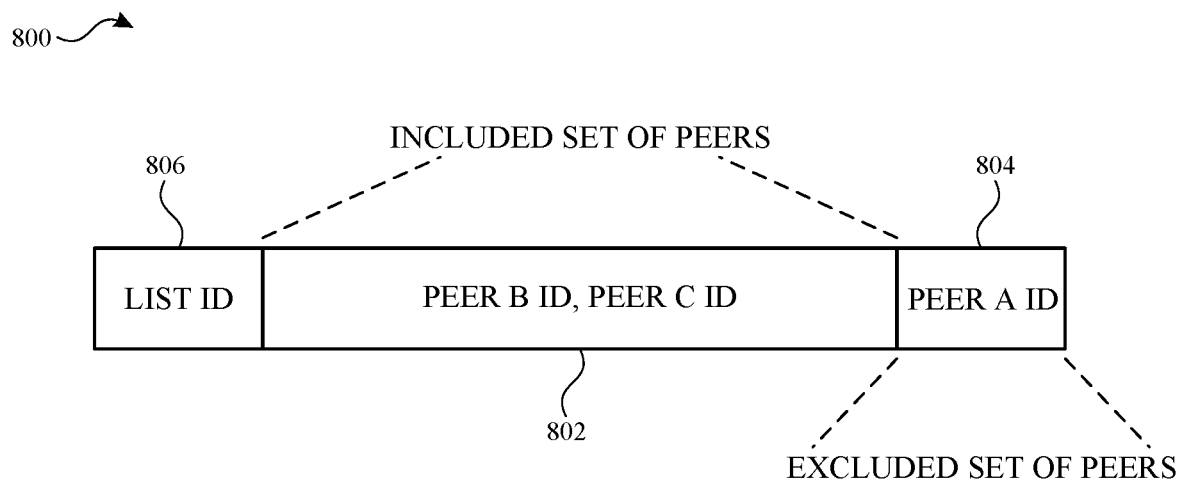
FIG. 8 illustrates an example of a peer list in some embodiments.

Once the first device confirms this code, the first device performs a process to add the second device to its list of peer devices. FIG. 7 conceptually illustrates one such process 700 for some embodiments of the subject technology. This process 700 will be described by reference to FIG. 8, which illustrates an example of a peer list 800 in some embodiments. As shown, the peer list 800 has a set of one or more "included" devices 802, a set of zero or more "excluded" devices 804, and a list identifier 806.

Each device in the included or excluded set is defined in terms of a peer identifier. The included set of devices identifies any device currently included in the peer circle, while the excluded set of devices identifies any device that was previously part of the peer circle, but at some point was removed from the peer circle. When a first device removes a second device from a peer circle, the second device needs to generate a peer identifier before it can be added back to another peer circle by the first device or by another device that approved the first device's removal of the second device.

Returning to FIGS. 6 and 7, the process 700 of the first device 600 adds the second device to its peer circle by (at 705) (1) defining a new peer list, (2) adding to the included set of this new peer list the peer identifiers in the included set of the first device's previous peer list (if any), (3) adding to the excluded set of this new peer list the peer identifiers in the excluded set of the first device's previous peer list (if any), and (4) adding the second device's peer identifier to the included set of the new peer list. The first device's previous peer list is the peer list that the first device was using at the time that it started to define the new peer list.

Next, at 710, the process 700 generates a list identifier for the new peer list. In some embodiments, the process computes a hash of the peer identifiers of the peer devices in the included set of peers 802, and designates this hash as the list identifier of the new peer list. In other embodiments, the process defines the list identifier as the hash of the peer identifiers of the peers in both the included set 802 and excluded set 804 of peers.

At 715, the process then signs the list identifier to generate a signature for the new peer list. In some embodiments, the process 700 uses the private key of the first device to sign the list identifier generated at 710. This signature is to allow other peer devices to identify the new peer list as a peer list that was generated by a legitimate peer device. In other words, at 715, the first device generates a signature that authenticates the new peer list as a list that was generated by a legitimate peer device. Finally, at 720, the process transmits the new peer list and the signature to the synchronizing server set 110 to store and to distribute to the other peer devices. The process 700 ends after 720.

As mentioned above, a peer device cannot add another peer device to a group when the other peer device provides a peer identifier that was previously excluded. This is enforced in different ways in different embodiments. Some embodiments enforce this by having the synchronizing server set 110 reject a device's request to join a peer group (e.g., a request to be associated with an account) when the device provides a peer identifier that is on an excluded set of a peer list for the group. In these embodiments, the synchronizing server set would not send such a request to another device (e.g., the first device in the above-mentioned example) to review. Other embodiments have each peer device enforce the requirement that a peer device cannot be added to a peer list when it provides a peer identifier that has been excluded before.

In addition to requiring a peer device to generate a new peer identifier to join a peer group from which it was previously excluded, some embodiments also require each peer device to include in its peer identifier an epoch period number, which is then used to identify which of the other peer devices can accept the peer device into a peer group. An epoch period number serves as a form of quantized temporal value that identifies a time period during which the device was added to a peer group.

In some embodiments, when a device wants to join a peer group, it generates a peer identifier that includes an epoch period number that is equal to or greater than the epoch period number of any other device in the group. The peer device that wants to join a peer group (e.g., that wants to be associated with an account) obtains the most recent epoch period number from the synchronizing server set after it provides to the server set the necessary credentials to join the peer group. This is before a peer device in the peer group even receives this device's request to join the peer circle or circles of the group.

Also, in some embodiments, a first device cannot add a second device to the peer group when the first device has an epoch period number that is less than the second device's epoch period number by a certain amount (e.g., two or more epoch numbers). Different embodiments enforce this differently. Some embodiments enforce this by having the synchronizing server set 110 not forward a new device's request to join a group to another peer device that has too old an epoch period number. Other embodiments have each peer device enforce this requirement by ignoring group join requests from devices with epoch period numbers that are larger than other peer device's epoch period number by a certain amount.

Figure 9:
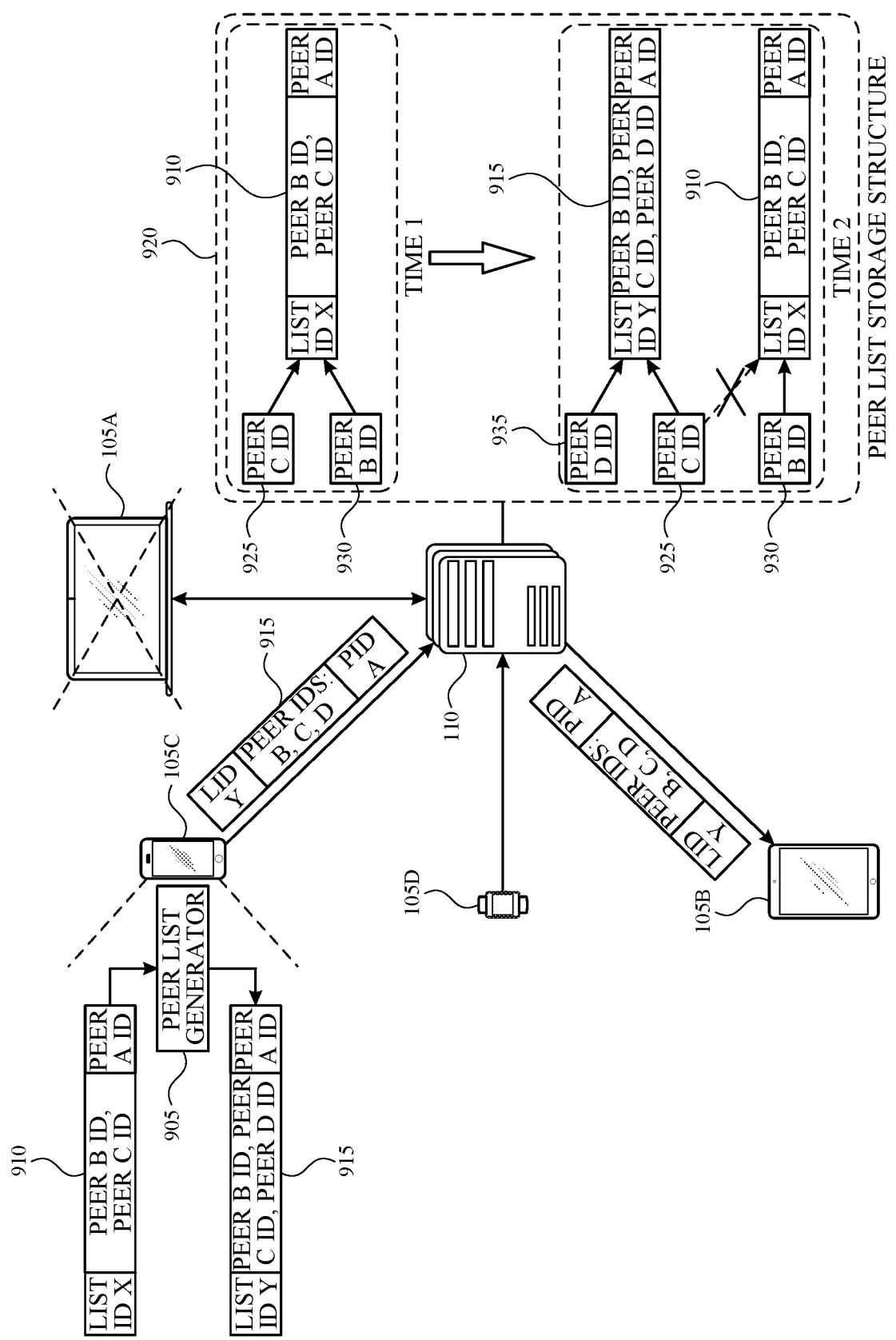
FIG. 9 illustrates an example of the synchronizing server set processing a new list of peers from a peer that accepts a new peer into a peer circle.

FIG. 9 illustrates an example of the synchronizing server set processing a new list of peers from a peer that accepts a new peer into a peer circle. In this example, the circle of peers currently includes a smartphone 105c and a tablet 105b. This group also previously included a laptop 105a. Also, in this example, the smartphone 105c accepts the smart watch 105d into the group of peers.

Accordingly, a peer list generator 905 of the smartphone 105c generates a new peer list 915 by copying an old peer list 910 and adding the peer identifier of the smart watch 105d to the new peer list 915. As shown, the old peer list 910 specifies the peer IDs of the smartphone 105c and tablet 105b in its included set of identifiers, while specifying the peer ID of the removed laptop 105a in its excluded set of identifiers. The new peer list 915 specifies the same peer IDs in it's included and excluded sets except that it also specifies the peer ID of the smart watch 105d in its included set.

The smartphone 105c sends its new peer list 915 to the server set 110, which stores this peer list 915 in its peer list storage structure 920. The synchronizing server set stores each list in the storage structure 920 as an immutable object that can be referred to by other peer devices. As an immutable object, no peer list stored by the server set can be modified by any peer device in the peer group or by the server set. In other words, no peer device can be added or removed from a previously defined peer list. Other than storing a peer list from one peer device, the synchronizing server set in some embodiments only (1) can add or delete references to the peer list by other peer devices when the other peer devices select the peer list, and (2) can delete a peer list when no peer device identifies this list as the list that correctly identifies a circle of peers for that device.

Before getting this new peer list 915, the peer-list storage structure 920 only stored the old peer list 910, as indicated by this structure content that is displayed for Time 1 in FIG. 9. At this time, the peer list 910 was referred to by both the smartphone 105c and tablet 105b, as indicated by the records 925 and 930 for these peers referencing the peer list 915. In some embodiments, a peer device references a peer list by signing the list identifier of that peer list, as mentioned above.

After getting the new peer list 915, the peer-list storage structure 920 stores both the old and new peer lists 910 and 915. This is indicated by the content of the structure 920 that is displayed for Time 2 in FIG. 9. At Time 2, the peer records 925 and 935 of the smartphone 105c and smart watch 105d refer to the new peer list 915, while the peer record 930 of the tablet 105b refers to the old peer list 910. As shown, the reference between the smartphone's record 925 and the old peer list 910 has been eliminated at Time 2, as the smartphone no longer refers to this old peer list.

FIG. 9 also shows that after receiving the peer list 915, the synchronizing server set 110 distributes this peer list to the tablet 105b. In other embodiments, the server set notifies the tablet regarding the availability of this peer list, and the tablet retrieves this peer list from the server set 110. The server set distributes or otherwise makes the new peer list 915 available to the tablet 105b because the synchronization system of some embodiments requires each peer device to identify its own list of peers in a circle.

Figure 10:
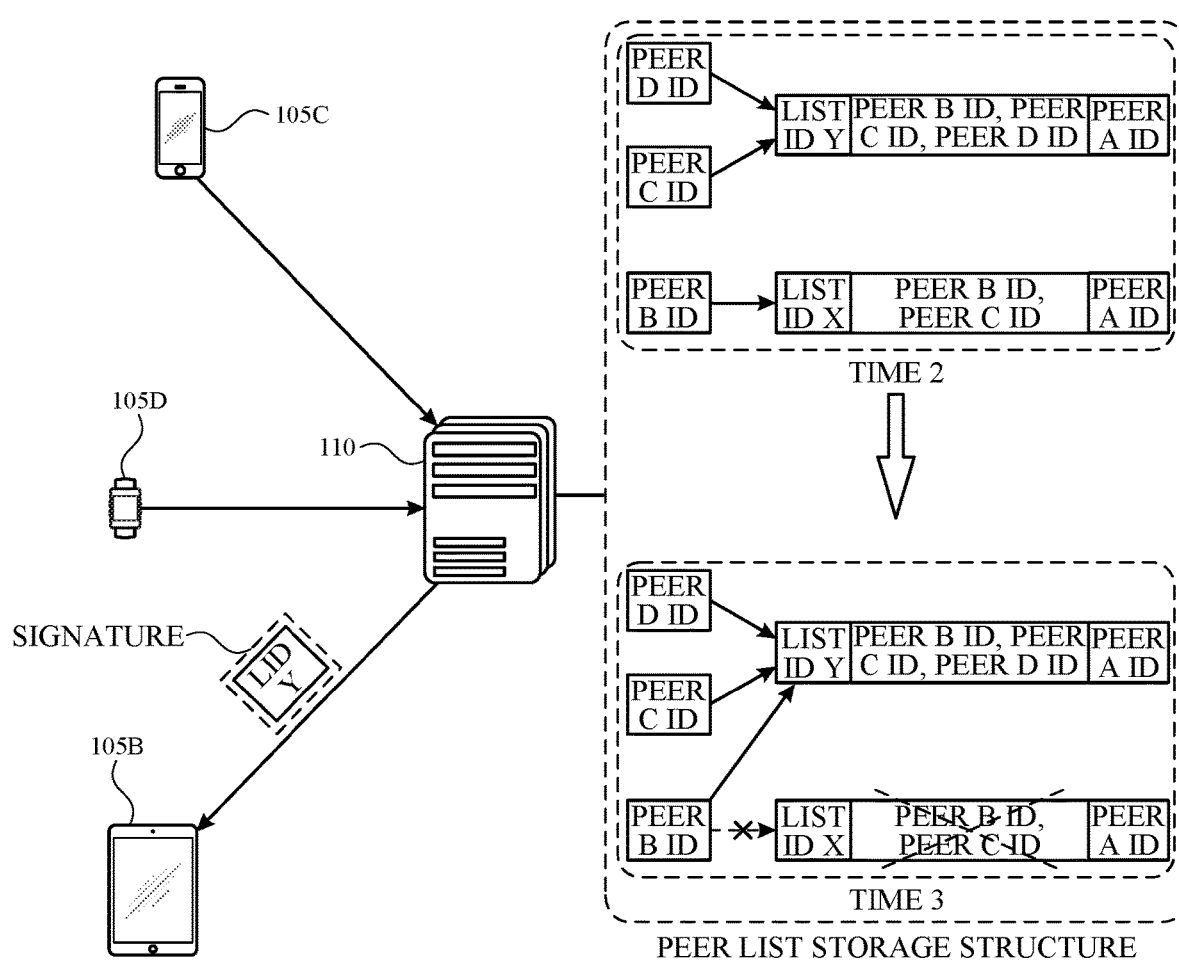
FIG. 10 illustrates that after a tablet receives a new peer list and compares this list to the previous peer list that it was using, the tablet returns to the server set a reference to the new peer list to indicate that this tablet has selected the new peer list.

FIG. 10 illustrates that after the tablet 105b receives the new peer list 915 and compares this list to the previous peer list that it was using, the tablet 105b returns to the server set 110 a reference to the new peer list 915 to indicate that this tablet has selected the new peer list. As mentioned above, this reference is a signature that the tablet generates (e.g., by using its private key) for the list identifier for the peer list 915 (i.e., it is a signed copy of the list identifier for the peer 915). This signature serves as an indication to the other peer devices that the tablet 105b has identified the peer list 915 as the list that accurately identifies the circle of peer devices. To compare the new peer list 915 to a previous peer list, the tablet 105b in some embodiments compares the attributes of each peer list to determine which peer list is more trustworthy. For instance, in some embodiments, the smart watch 105d uses the included list and exclude list to determine whether there are new devices that should be trusted (included) or not trusted (excluded).

FIG. 10 also illustrates that after the server set 110 receives the tablet's reference to the new peer list 915, the server set 110 modifies its records in the peer-list storage structure so that all three peer's records 925, 930 and 935 refer to the new peer list 915. The association between all three peer records and the new peer list 915 are shown at a Time 3. As shown, the reference between the tablet's record 930 and the old peer list 910 has been eliminated at Time 3, as the tablet no longer refers to this old peer list. FIG. 10 also shows that at Time 3, the old peer list 910 has been discarded as no peer records currently refers to this peer list.

Figure 11:
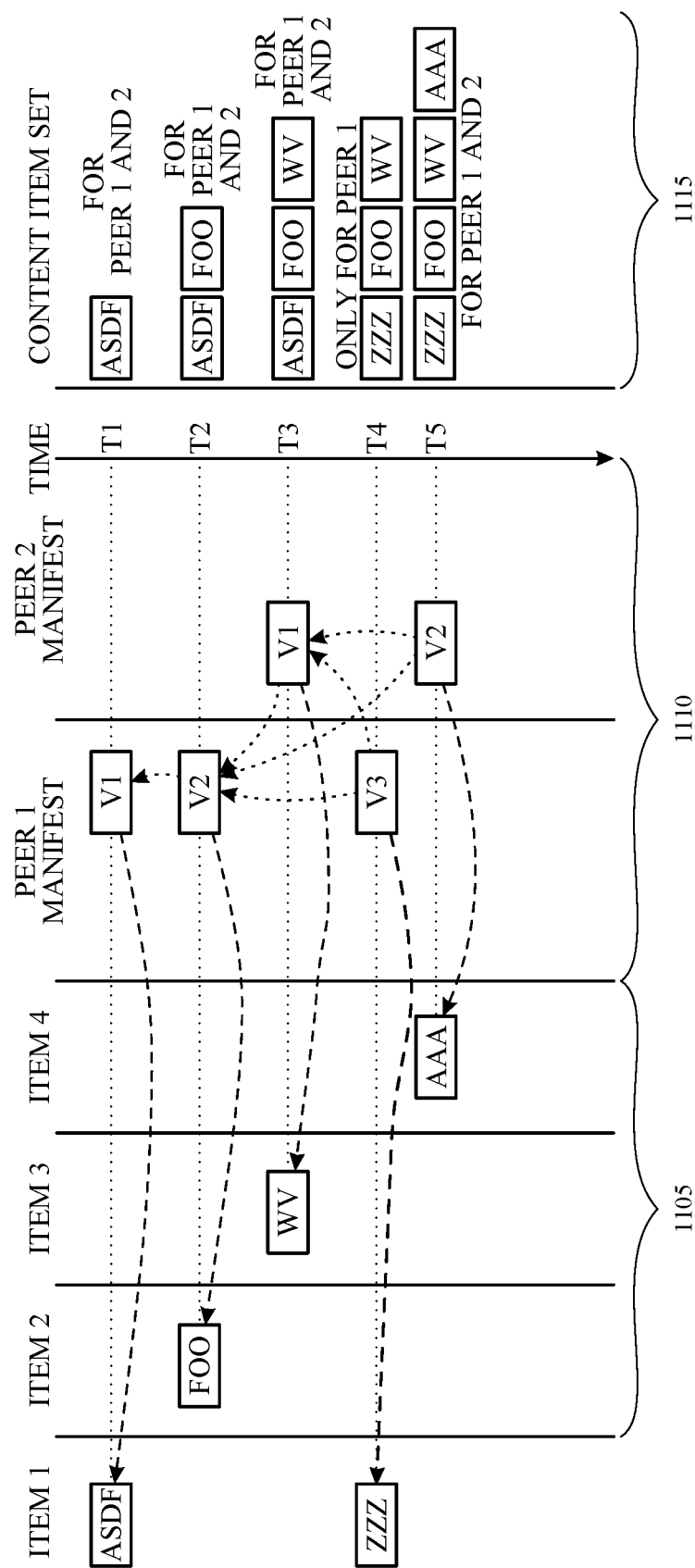
FIG. 11 illustrates an example of peer devices using version manifests to identify the items in a content item set.

FIG. 11 illustrates an example of peer devices using version manifests to identify the items in a content item set. In this example, the circle of peers for the content item set includes only two peers. Also, in this example, each peer only provides modifications to the content item set (i.e., does not provide the entirety of content item set each time that it makes a modification to this set). The vertical axis in this example identifies five different instances in time t1-t5. The horizontal axis has three segments 1105, 1110 and 1115. The first segment 1105 shows the value of up to four items 1-4 of the content item set. The second segment 1110 identifies different version manifests that are provided at different instances in time by different peers. The third segment 1115 shows the items in the content item set at each of the five instances in time.

As shown, at time t1 and t2, the peer 1 adds items 1 and 2 to the content item set, and generates two version manifests that identify the two new modifications to this set. As shown, the item 1 has a value asdf, while item 2 has a value foo. As further shown, the second manifest v2 of peer 1 refers to the first manifest v1 of peer 1, as the second manifest follows the first manifest.

At time t3, peer 2 adds item 3 to the content item set, and generates a version manifest that identifies the new modifications to this set. As shown, the item 3 has a value wv. As further shown, the first manifest v1 of peer 2 refers to the second manifest of peer 1 as so far peer 2 has only generated or received manifests from peer 1 and the second manifest from peer 1 is the latest manifest from this peer. In some embodiments, each time a peer generates a manifest for a content item set modification, that manifest refers to the last manifest (1) that each peer (including the particular peer) generates for the content set and (2) that was received by the particular peer. Based on the second manifest of peer 1 and the first manifest of peer 2, the peers identify the membership of the content item set to be asdf for item 1, foo for item 2 and wv for item 3 at time instance 3.

At time t4, peer 1 modifies item 1 in the content item set to have the value zzz. It also generates a third version manifest for itself that identifies the new modifications to this set and refers to the second manifest of peer 1 and the first manifest of peer 2 as the last seen manifests from these two devices. Based on the second manifest of peer 1 and the first manifest of peer 2, the peer 1 identifies the membership of the content item set to be zzz for item 1, foo for item 2 and wv for item 3 at time instance 4.

At time t5, peer 2 adds item 4 in the content item set to have the value aaa. Peer 2 adds this item before receiving and processing peer 1's modification to the content item set at time t3. Hence, the second version manifest that peer 2 generates at time 5 refers to the second manifest of peer 1 and the first manifest of peer 2 as the last seen manifests from these two devices. This second manifest of peer 2 also identifies the addition of aaa as item 4 in the content item set.

Even though peer 2's second manifest does not refer to peer 1's last manifest from time t4, these two manifests (v3 from peer 1, and v2 from peer 2) do not specify conflicting updates to the content item set. Hence, each peer device follows the sequential update to the content item set based on the updates provided by the non-conflicting final two manifests. Had these two manifests conflicted (e.g., v3 of peer 1 identified zzz for item 1, while v2 of peer 2 identified aaa for item 1), the peer devices in some embodiments would define the content item set based on the manifest that was last received and that identified the most complete list of prior version manifests. Hence, had v3 of peer 1 identified zzz for item 1, while v2 of peer 2 identified aaa for item 1, the peers 1 and 2 would select aaa as the value for item 1.

Figure 12:
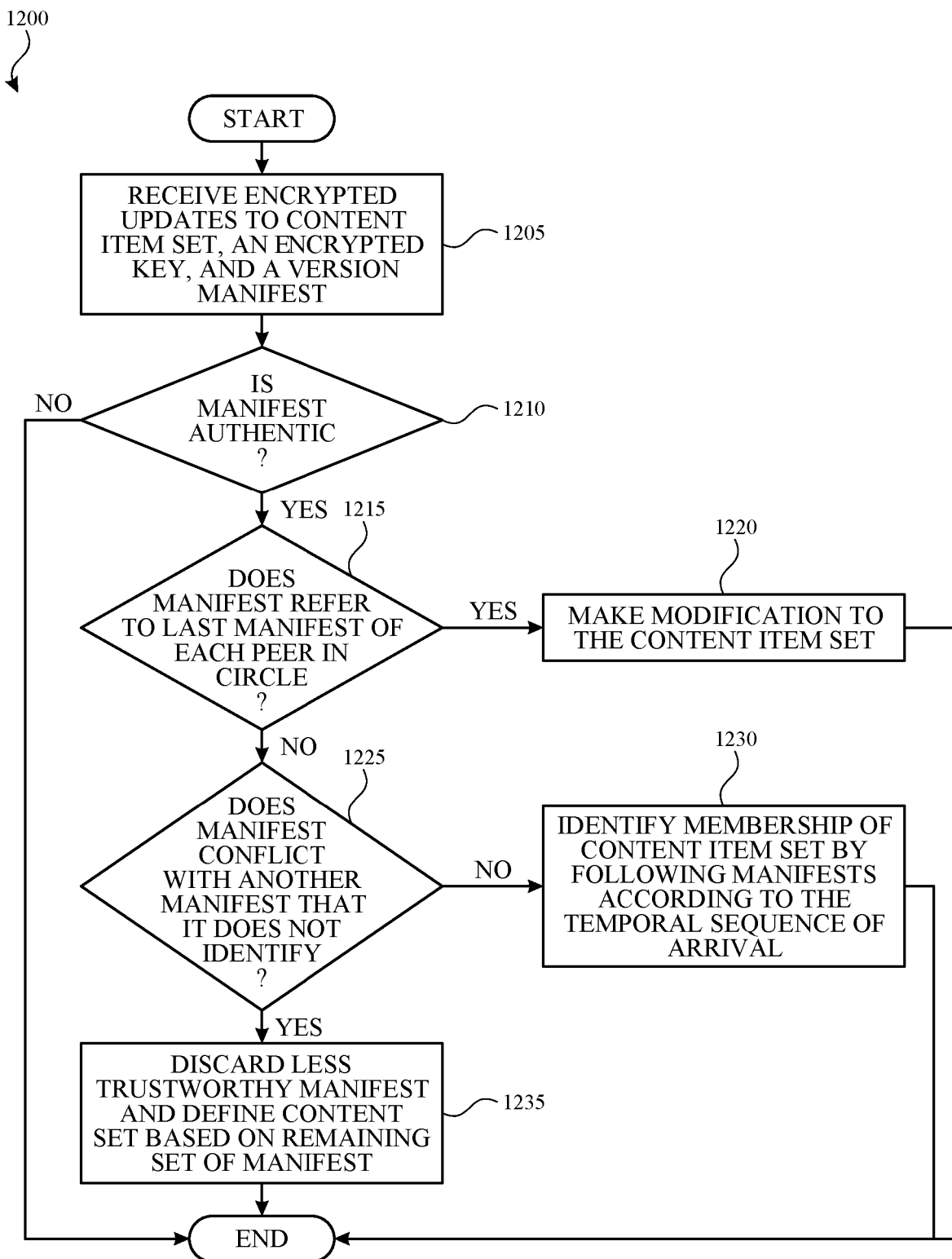
FIG. 12 illustrates a process that a first peer device performs to update a content item set received from a second peer device through the server set.

FIG. 12 illustrates a process 1200 that a first peer device performs to update a content item set received from a second peer device through the server set 110. This process 1200 shows how a peer uses a manifest to update a content item set. As shown, the process 1200 starts when it receives (at 1205) an encrypted update to a content item set. As mentioned above, the update in some embodiments includes each content item in the set including those not modified, while in other embodiments, the update only includes modified or new content item(s) in the content item set. Along with the encrypted content(s), the process also receives an encrypted key and a signed version manifest.

Next, at 1210, the process authenticates the signature of the version manifest. In some embodiments, the second peer device signs the version manifest by using its private key. In these embodiments, the process 1200 of the first device uses the public key of the second peer device to authenticate the signature of the version manifest. When the process 1200 determines (at 1210) that the version manifest is not authentic, it discards the update received at 1205, and then ends.

On the other hand, when the process determines (at 1210) that the version manifest is authentic, it determines (at 1215) whether the received version manifest refers to the last manifest received (through the server set) from each other peer device. For example, for each of the initial four-time instances t1-t4 in the example illustrated in FIG. 11, each peer device determines (at 1215) that the received manifest refers to the last manifest received from each other peer device.

When the process 1200 determines (at 1215) that the received manifest refers to the last manifest received from each other peer device, the process 1200 makes (at 1220) the modification to the content item set based on the update received at 1205. If the update contains a new content item, the process 1200 adds this content item to the set. If the update contains a modified version of a previously supplied content item, the process 1200 replaces the previously supplied content item with its modified version in the content item set. In some embodiments, the process 1200 stores on the first device the content item set in an encrypted format, as the first device decrypts the encrypted content items when it needs to access them. After 1220, the process ends.

When the process 1200 determines (at 1215) that the received manifest does not refer to the last manifest received from each other peer device, the process 1200 determines (at 1225) whether the received manifest specifies an update to the content item set that conflicts with an update specified by another manifest that was received earlier. In the example illustrated in FIG. 11, peer 1 determines that the update received at time t5 does not refer to the last manifest v3 of peer 1. This update at time t5 from peer 2 does not conflict with any other update, including the update at time t4 from peer 1 as the update at time t5 provides a value aaa for previously undefined item 4. Had the update at time 5 from peer 2 provided the value aaa for item 1, this update would have conflicted with the previous update at time t4 from peer 1, without referring to the manifest v4 at time t4.

When the process 1200 determines (at 1225) that the received manifest does not specify an update to the content item set that conflicts with an update specified by another manifest that was received earlier, the process identifies (at 1230) the content items in the content item set (stored on the first device) by following the updates specified in the previously received manifests according to their temporal sequence of arrival. In other words, the last received manifest that provides or modifies a value for a content item in the set defines that content item's value. Following this logic, peers 1 and 2 at time t5 in the example of FIG. 11, update the content item set to include values zzz, foo, wv and aaa at time t5. After 1230, the process ends.

When the process 1200 determines (at 1225) that the received manifest specifies an update to the content item set that conflicts with an update specified by another manifest that was received earlier, the process discards (at 1235) the update that has the less trustworthy manifest and defines the content item set (stored on the first device) based on the remaining manifests, and then ends. When more than two manifests conflict, the process maintains (at 1235) the most trustworthy manifest from the group of conflicting manifests. When selecting between first and second conflicting manifests, the process 1200 chooses the first manifest as more trustworthy (1) if both manifests refer to the same prior sets of manifests and the first manifest was received last, or (2) if the first and second manifests refer to different sets of manifests, and the first manifest refers to the most complete set of prior manifests. In other embodiments, the peers use other criteria to select one manifest from two or more conflicting manifests. For example, in some embodiments, the peers pick the manifest with the latest time and date stamp. In still other embodiments, use other criteria.

Several more detailed examples of the synchronization system of some embodiments will now be described by reference to Tables 1-4, and FIGS. 13-16. In this description, the data schema of the server set is first described. This discussion is followed by a discussion of the schema of policy documents that define trust levels between different peers in a group. Next, content keys, key hierarchy and version manifests of some embodiments are further described. Finally, the cloud synchronization layer of some embodiments is further described.

Tables 1-3 below describe the data schema that the server set uses in some embodiments to define peers, trust signatures, list of peers, and epoch numbers (epochs). In some embodiments, a single peer record represents each peer device. This peer record is defined by reference to the following fields that are defined in Table 1 below: peerID, permanentInfo, permanentInfoSig, stableInfo, stableInfoSig, wrappedPrivateKeys, vouchers, circle, dynamicInfo, dynamicInfoSig, and vectorClock. Some of the fields cannot change, while others can change, as indicated by the third column of Table 1.

TABLE 1

Peer Record

| Name | Description | Changes |
|---|---|---|
| peerID | Hash of permanentInfo + permanentInfoSig. This is the key by which this record is found. | Never |
| permanentInfo | A serialized property list (plist) containing:<br>machineID: Machine identifier (MID) from IDMS, used when IDMS says a device is no longer trusted.<br>modelID: A hardware model identifier, used to validate which views the peer can participate in, and to describe the device in UI<br>epoch: An integer designating the epoch in which this peer identity is valid. A peer will never trust a peer that is more than one epoch older than itself.<br>trustSigningKey: Public key with which this peer's trust signatures should be verified | Never |
| permanentInfoSig | Signature over permanentInfo made with trustSigningKey | Never |
| stableInfo | A serialized plist containing:<br>clock: A Lamport timestamp, advanced by all peers. Used to prevent replay attacks and to help with issue triage.<br>build: A string denoting the version of software running on the peer<br>name: A string chosen by the user as the | When:<br>software is updated<br>user changes device name<br>sync keys are rolled |

TABLE 1-continued

Peer Record

| Name | Description | Changes |
|---|---|---|
| | name of this device.<br>serial: The hardware serial number, as a string<br>syncSigningKey: Public key used by this peer for sync signatures<br>syncEncryptionKey: Public key used by this peer for sync encryption<br>policyVersion: Integer version of Policy presented by this peer; record ID for Policy, which is described below.<br>policyHash: Hash of the serialized policyDoc corresponding to policyVersion, as described below.<br>policySecrets: A dictionary of secretName-secretKey pairs that unlock redacted sections of the policyDoc | |
| stableInfoSig | Signature over stableInfo made with trustSigningKey | When stableInfo changes |
| wrappedPrivateKeys | Encrypted with the escrowed secret, a serialized plist containing:<br>private key corresponding to trustSigningKey<br>private key corresponding to syncSigningKey<br>private key corresponding to syncEncryptionKey<br>Used for restore flow. | When the device passcode or password changes |
| vouchers | Array of owning references into voucher records. Each peer owns the voucher records for which it is the beneficiary. Every record owned by this array will have beneficiaryID equal to this peer's peerID. | When the peer gets signed |
| circle | A validating non-owning reference to the Circle record that lists the peers that should be included in and excluded from membership. This peer trusts the peers included in the circle. | Whenever a peer joins or departs the circle |
| dynamicInfo | A serialized plist containing:<br>circleID: Same as circle.circleID.<br>clique: A random UUID established by the first peer to be a member.<br>removals: The number of peers that have been removed (excluded) since this clique was established, (radar)<br>clock: A Lamport timestamp, advanced by all peers. Used to prevent replay attacks and to help with issue triage. | Whenever a peer joins or departs the circle |
| dynamicinfoSig | Signature over dynamicInfo made with trustSigningKey | Whenever dynamicInfo changes |
| vectorClock | A serialized plist containing a key-value pair for every peer, where the key is the peerID and the value is the Lamport timestamp (dynamicInfo.clock) of the most recent update seen from that peer. This field will be written to the server as an aid to issue triage, but will not be read by any peer and does not play a functional role in determining trust. | |

As mentioned above, once a peer has been excluded from a circle, it will never be reintroduced into the circle in some embodiments. If a device wants to rejoin, it needs to generate a new trustSigningKey, which results in a different permanentInfo and therefore a different peerID. In some embodiments, the hardware serial number of a device is in the stableInfo even though it will presumably never change. Some embodiments do not put the hardware serial number of the device in permanentInfo of the peer record to enable any trust function. Some embodiments do not include the serial number in the stableInfo in order to keep permanentInfo small.

A voucher is a record signed by a "sponsor" peer to say that a "beneficiary" peer is trusted. This record is written to the server set storage by the beneficiary in order to present it as evidence to other peers that it should be allowed to join the circle. The beneficiary "owns" the records it presents.

Vouchers are used in flows where the sponsor may not have network access to update its own dynamicInfo, e.g., when the device is first being setup or during backup restore. Table 2 lists the fields of a voucher record.

TABLE 2

Voucher Record

| Name | Description |
|---|---|
| voucherInfo | A serialized plist containing:<br>beneficiaryID: The peerID of the peer to be trusted, according to this voucher.<br>sponsorID: The peerID of the peer that signed this voucher.<br>clock: This voucher is only valid while the sponsor's dynamicInfo.clock is equal to this clock value. |

TABLE 2-continued

Voucher Record

| Name | Description |
|---|---|
| voucherInfoSig | Signature over voucherInfo made with the sponsor's trustSigningKey |

In some embodiments, the peer voucher record ID is the beneficiary ID followed by the sponsor ID. Also, in some embodiments, a voucher expires as soon as the sponsor updates its dynamicInfo with a clock that differs from the clock value in the voucher. The expectation is that when the sponsor can contact the server set, it will update its circleID with a circle that includes the beneficiary, and so the voucher is no longer needed.

The synchronizing server set in some embodiments maintains a circle table for each group of peers. Each circle table stores one or more immutable circle records. Multiple peer records can reference each circle record. The circle records will be deleted when no longer referenced by any peer records. Table 3 lists the fields of a circle record.

TABLE 3

Circle Record

| Name | Description |
|---|---|
| circleID | Hash of include + exclude. |
| include | A sorted list of peerIDs included in the circle. |
| exclude | A sorted list of peerIDs excluded from the circle. |

Epochs provide a mechanism for dropping old excluded peerIDs from the circle, while guaranteeing that they do not reenter circles. Without this mechanism, the exclude list would continuously grow. Even if no currently visible dynamicInfo records or vouchers are asserting that an excluded peerID should be trusted, some embodiments do not have another way guaranteeing that a peer is not about to write such a record. Without the epoch boundary, some embodiments cannot distinguish between (1) a peer that has excluded a peerID, which it subsequently drops from its exclude list, and (2) a peer that has not (yet) responded to that peerID being introduced into trust. Hence, some embodiments use an epoch boundary after which a peer will never be trusted.

As listed in Table 1, each peer's permanentInfo contains an epoch integer. A peer will never trust a peer that is more than one epoch older than itself, and so peers older than that need not be listed in the circle's exclude list. When a new peer identity is created, the peer will normally use the newest (largest) epoch value among the existing peers.

Some embodiments advance the current epoch number by introducing a new peer identity with an incremented epoch. When a peer trusts a peer with an epoch greater than its own, it should set about rolling its own peer identity in order to keep up. Peers that fall more than one epoch behind are left behind and excluded from trust, requiring user action to reintroduce them.

In some embodiments, a decision to advance the epoch is done on the basis of heuristics. Advancing the epoch causes all peers to roll their identities, which is an opportunity to generate new trust signing keys. It also allows the peers that advance to trim their circles of any peer identities from two or more epochs ago. In some embodiments, the epoch might be advanced roughly once per year, or more frequently if the number of excluded peerIDs is large.

As mentioned above, the synchronization system of some embodiments can create multiple circles for synchronizing multiple data views when not all content items should be synchronized with all the peers in a peer group. This is the case in some embodiments when some devices in a peer group are more secure than other devices in a peer group. Devices are more or less secure based on a variety of factors, such as (1) whether their private keys held in a secure enclave processor (SEP), (2) whether the device senses when it is strapped to the user's wrist, (3) whether the device is intended for private use or shared among a family, and (4) whether the device's operating system enforces a passcode and/or TouchID for access.

Some embodiments allow less secure devices to access the less sensitive data they need, while continuing to protect the more sensitive data when a less secure device is compromised. From the user's perspective, a device is either trusted or not based on whether the device is in the list of trusted devices. For the sake of understandability and simplicity, some embodiments define a data model that matches the user's mental model.

Some embodiments define a policy document that is based on a schema for encoding policy regarding trust between devices and views into a form that can be interpreted by all peer devices. For a list of existing device models with known security characteristics, and a list of existing views with known sensitivity level for the data that they contain, policy document specifies policies regarding (1) the existing views that can be accessed by the existing device models, and (2) existing device models that can introduce other device models into trust.

In some embodiments, the schema of the policy documents allows for future changes to data-access policies and device-introduction policies, and addition of new data views and device types (some of which might not be publicly announced or available). The policy enforcement process of some embodiments also prevents malicious entities from compromising existing devices and software without requiring the user to explicitly trust an updated policy by trusting a new device or installing a software update.

In some embodiments, a policy document is a serialized property list (plist). FIG. 13 illustrates an example of a policy document 1300 used in some embodiments of the subject technology. As shown, the policy document 1300 is presented in a JSON-like form with fields set off by one form of brackets { } define dictionaries, while fields set off by another form of brackets [ ] define arrays.

This policy document has four dictionaries 1305, 1310, 1315, and 1320 that specify policies for various tasks. These dictionaries are (1) a modeltoCategory dictionary 1305 that specifies settings for mapping model ID to trust categories, (2) a categoriesbyView dictionary 1310 that specifies rules for permitting access to views, (3) an introducersByCategory dictionary 1315 that identifies categories of devices that are allowed to introduce new peers into a circle and the categories of devices that they can introduce, and (4) a redactions dictionary 1320 that define policy overlays. Each of these dictionaries will be further described below.

In some embodiments, policy documents are stored in read-only databases of the synchronizing server set. Table 4 lists the fields of a policy record in this database. This policy record contains a policy document.

TABLE 4

Policy Record

| Name | Description |
| --- | --- |
| policyVersion | Integer version of this policy, supersedes all lower version numbers |
| policyDoc | A policy document in the form of a serialized plist |
| policySig | A signature over policyDoc made with signing key of the entity managing the synchronizing server set |

In some embodiments, all policy versions are maintained in the public database in perpetuity and are never modified. A peer "presents" a policy by identifying it via the stableInfo.policyVersion and stableInfo.policyHash fields in its peer record, as described above. The policyVersion field is present within the policyDoc, and is therefore part of the content that is signed by the signing key of the entity managing the synchronizing server set and hashed by stableInfo.policyHash. The policy that applies is the most recent of the policies presented by a set of peers. This prevents a malicious entity from publishing a new policy that circumvents policy restrictions without user action.

The trust categories that are used in the modeltoCategory dictionary 1305 are a way to group together many device types, for brevity in other parts of the policy. The name of each trust category is an arbitrary string that has meaning only within a single policy. This dictionary maps each model ID to exactly one trust category. Each device is of a particular model, identified by a model ID (e.g., "PhoneX7,1"). The model ID is part of the immutable permanentInfo that identifies a peerInfo.

To map any model ID string to a trust category, the modelToCategory dictionary contains an array of patterns. A model ID string like "PhoneX7,1" matches a pattern if it begins with the prefix field given in the pattern, e.g. "PhoneX". In some embodiments, the first matching pattern wins, and the model ID is assigned that category. In this way, it is possible to make exceptions by listing more specific patterns earlier, e.g. "PhoneX4" could be given less access than other PhoneXs.

An empty prefix string will match any model ID, and this could be used as a final catchall pattern. Some embodiments do not use such a catchall rule because (1) every device presents a policy version that includes its own model ID, and (2) a peer considering whether to allow a new member always has available the policy presented by the new member. Because of this second criteria, some embodiments include a new member's policy in the consideration of whether to allow it to join, rather than just relying only on the most recent of the policies of peers that are already trusted.

The categoriesByView dictionary 1310 identifies the categories of devices that are allowed to access each view. In some embodiments, the categoryByView dictionary is a dictionary of key-value pairs, with each key naming a view, and the value expressing an array of trust categories. View names match those in ViewList.list, which will be further described below.

The introducersByCategory dictionary 1315 identifies the categories of devices that are allowed to introduce new peers into the circle. In some embodiments, this dictionary 1315 is a dictionary of key-value pairs, with each key naming the trust category of the already-trusted peer doing the introducing, and the value expressing an array of trust categories of the devices it may introduce.

The redactions dictionary 1320 stores encrypted policy overlays, which can be unencrypted with keys from stableInfo.policySecrets. This dictionary is provided in some embodiments to address circumstances like the following. When one user owns several different devices (e.g., computer, a smartphone, a smart watch), the unencrypted part of the policy document is sufficient to know the relationships between those devices and the views they can access. Each of those devices presents a stableInfo with an empty policySecrets field.

When a user has a prototype of a new unannounced category of a device X with a modelID "X,1," a manufacturer of this product can prevent the name of this device from being exposed in the cleartext part of policy document by assigning the secretName "foo" with a corresponding secretKey. The device X's peer record presents these values in stableInfo.secretName and stableInfo.secretKey. The policy document contains redactions. "foo" (in the redaction dictionary 1320) for which the corresponding value is another policy document instance, encrypted with the secretKey. Thus, when the user possessing the device X signs that device into their account, the other peers (the computer, phone, watch) see the new stableInfo record containing the secretName="foo"/secretKey, they decrypt the redactions. "foo" policyDoc and apply it as an overlay onto the cleartext part of the policy document. This provides the mapping from the modelID "X,1" to the appropriate category, any additional views etc.

In some embodiments, the encrypted policy document overlay has the same structure as the cleartext policy document. The two are combined as follows in some embodiments. The elements of the overlay's modelToCategory array are prepended to the modelToCategory array in the cleartext policyDoc. The {prefix: "X", category: "full"} is considered first. The categoriesByView and introducersByCategory dictionary values are then formed by the set union of the array for each key.

It is possible that a user has a phone presenting policy version (e.g., v2) while the device X presents another policy version (e.g., v1). The secretName="foo" and the corresponding secretKey can be applied across all policy versions, not just the policy presented by the current device X software. If the second version of the policy document contains redactions. "foo" then it should be unencrypted using the same secretKey and applied as an overlay just as before. If the second version of the policy document does not contain redactions. "foo" then presumably the device X has been announced and the cleartext portion of the second version of the policy document will handle it correctly.

In some embodiments, each peer consults the newest version of policy presented by the set of peers to be trusted, and applies to it all of the overlays unlocked by the secretName/secretKey pairs available from all of those peers. The following example illustrates one possible flow. Initially, a circle of devices A, B, and C all present version 1 of the policy. Device A then interacts with a device D, which is some device bringing along a new version 2 of the policy. Based on this policy, device A decides to introduce device D to the circle. Device D's permanentInfo and stableInfo is shared with devices B and C, either via a voucher or by uploading the peerInfo for this device D to the synchronizing server set. Devices B and C see that device A trusts device D, and so they check device D's stableInfo for a newer trust policy. Devices B and C then use the version 2 policy and decide to accept D into the circle.

As mentioned above, the peer devices encrypt each data item set with the content keys in some embodiments. Each content key in some embodiments exists in a directed acyclic graph (DAG) of wrapped keys. Each key in the DAG has a corresponding trust level. Thus, a device with a more limited trust level may only have access to part of the DAG. In some embodiments, a root key (a key without parent) will store its key wrapped with its own key. This simplifies the data model and allows the peer to check that it has the key for the record. For each key class, some embodiments designate only one key as the current key. Having only one current key for each key class facilitates key rolling, and prevents writing data with a rolled key. When a root key is rolled (and a new root key added), the old root key will be wrapped to the new root key. When no items exist in the hierarchy under the old root key, it can be deleted.

Figure 14:
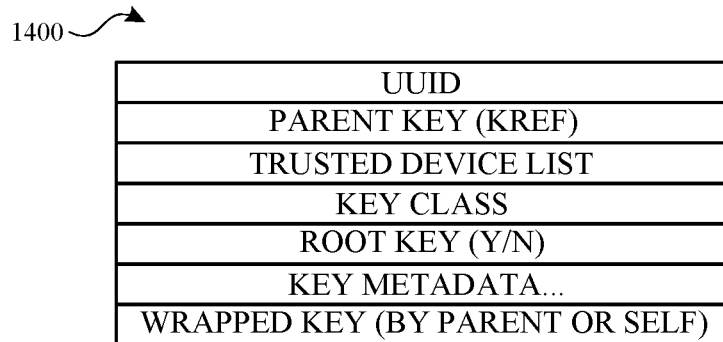
FIG. 14 illustrates an example of a key record of a key.

For some embodiments, FIG. 14 illustrates an example of a key record 1400 of a key in the DAG. As shown, the key record 1400 has a universal unique identifier (UUID) that identifies the record. It has a key reference to the key's parent key, if any. It also has a trusted device list that identifies the devices that are trusted for using this list. In some embodiments, the trusted device list is defined by reference to device types.

Figure 15:
FIG. 15 illustrates a key class record for some embodiments.

A key record 1400 also specifies a key class that identifies a class to which the key belongs. As mentioned above, each key class has only one key that is designated as the current key for that class. FIG. 15 illustrates a key class record 1500 for some embodiments. As shown, the key class record 1500 in some embodiments only specifies a key class parameter and a reference to the current key for the key class. In some embodiments, key references in records are specified in terms of the UUID of the key, while in other embodiments these key references are specified in other ways.

As shown in FIG. 14, the key record 1400 also specifies whether it is a root key or not. It also includes key metadata, which can include diagnostic data that could be useful in debug operations. Lastly, as shown, each key record 1400 is wrapped with a key of the parent key when the key is a non-root key, or with its own key when the key is a root key.

Figure 16:
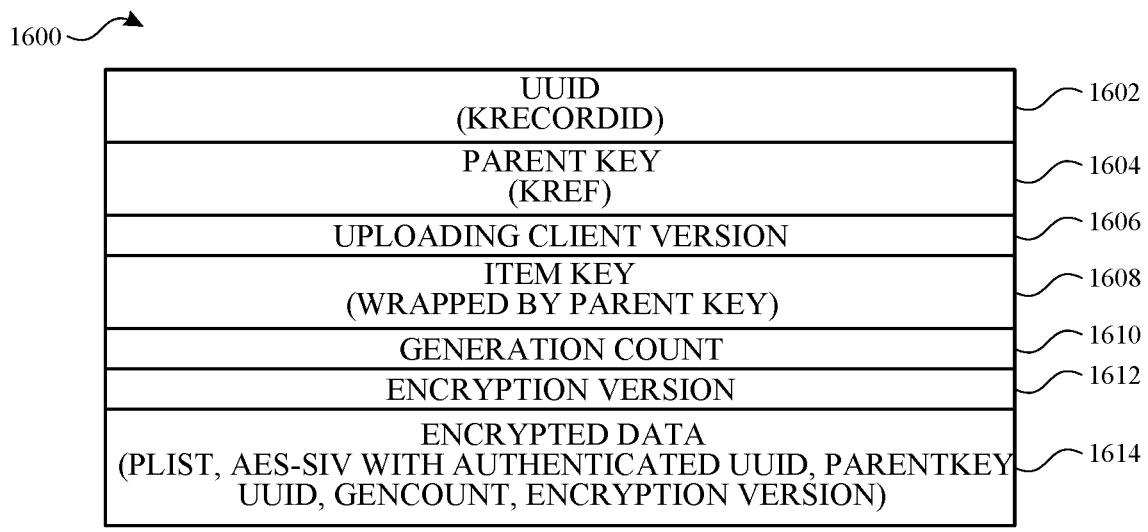
FIG. 16 illustrates a data item record for data item that in some embodiments is synchronized among a group of peers through the synchronizing server set.

Data records in some embodiments contain keychain items that encoded as an encrypted plist. FIG. 16 illustrates a data item record 1600 for data item that in some embodiments is synchronized among a group of peers through the synchronizing server set. This record includes a UUID 1602 for the record that is used to track individual record. A separate UUID is added and wrapped in a data blob 1614, which will then be used as the item's "persistent reference." The data blob 1614 contains the portion of the data record that is encrypted. This data blob also contains the values of the other fields (e.g., the parent key 1604, the generation count 1610, and the encryption version 1612) of the data item record 1600.

The data item record 1600 contains a reference 1604 back to the parent key under which they are wrapped. Each data item record has its own encryption key 1608, wrapped by the parent key. When the parent key is rolled, this item can then be rolled along by unwrapping its key, re-wrapping this key with the new parent key, and updating the record. This prevents re-uploading of the data item, which could be large.

The data item record 1600 also has a generation count 1610. In some embodiments, the generation count is authenticated via AES-SIV. The generation count must increase monotonically when a change is made to the record. Each peer will keep track of the latest generation seen for an item, and will throw away a server set update to a record which has a lesser generation count. To prevent resurrection, each peer will keep tombstone records. Generation count rollback only occurs in times of active attack or in face of large number of bugs in some embodiments. The data item record 1600 also has an encryption version 1612 that refers to the configuration used to encrypt the data blob.

A peer device's version manifest expresses that peer's definition of the content items within a set of content items. Some embodiments do not have the synchronizing server set store one manifest for a peer group, because simultaneous writes of independent items from multiple peers would fail (e.g., a manifest sent with the latter write could be out of date). Accordingly, as mentioned above, some embodiments have each peer device maintain its own manifest. Such manifest not only allow the peer devices detect unsynchronized content items, but also detect malicious tampering, e.g., detect that an item disappears from the synchronizing server set without any signed manifest attesting to this items removal.

A manifest is a signed list with a UUID that is equal to a hash of the items in the content item set, (UUID:H(item)). In some embodiments, the hash is the digest/hash of the current content items in the set of content items. The manifests also include a list of known manifests that includes a generation count and hash of all earlier manifests for the time that the particular manifest was created. The manifests also contain a signature over both lists, using a signing key of the peer that created the manifest.

A manifest contains the generation count in order to prevent an adversary from replaying old manifest (that could contain old version of items the attacker would like to replay). Thus, to gain the anti-tampering benefits of signed manifests, each peer's manifest in some embodiments contains the generation count, and manifests with generation counts older than the most recently seen manifest will be ignored with prejudice.

When a single manifest contains (current or greater) generation counts for each other known manifest, then this manifest is newer than all other manifests, and can be considered authoritative. When two (or more) manifests point to preceding versions of each other, then there is no ordering between them. In this case, their intersection (all elements where they agree) can be considered authoritative: all items in the intersection must match exactly.

For their disjunction union (i.e., all elements where the two or more manifests disagree), either can be correct: for each item, both (or more) states are allowed, but no others. This includes item removal (as that operation is equivalent to item addition). The adversary, if they choose to play games, can do so at this time, but can only modify the items in this disjunctive state, and only along the changes that were just attempted. Item rollback is therefore limited to the state of the item as it just was, and is therefore equivalent to denying a write but telling the writer that the write was successful.

In some embodiments, each view will correspond to its own zone in the peer group's private database in the synchronizing server set. This way, each zone will have exactly one top-level key, which grants access to the entire zone. Since notifications are done on a per-zone basis, peers are only notified for the zones to which they have access.

With a single repository of data comes a single key hierarchy. All peers will mirror this key hierarchy locally, and the synchronizing server set data structures will ensure that new writes always use the most recent key for any given record type. Each record type will have a single current key item, which simply has a reference to the current key record. All item uploads will set this reference as part of the transaction. If this current key has rolled, the transaction will fail and the peer notice that it is out of date.

When the synchronizing layer of device is notified of a trusted device revocation, the synchronizing layer (1) generates new root-level keys for all levels for which it has access, (2) generates new subkeys under those root-level keys and wraps them appropriately, and (3) uploads all keys and sharing records and update all current key records. Failure at any of these steps causes the synchronizing layer to check for new keys already rolled by another device. If such keys exist, the synchronizing layer merges them into the local hierarchy. The synchronizing layer then repeats the transaction with any key not rolled by the other device. This process continues until all keys under all root keys no longer contain the revoked device in their trust list.

In some embodiments, key rolling does not necessarily involve updating every item in the rolled key's zone. Instead, a single transaction will create a hierarchy of new keys, and then items will be updated as needed. To access these items, the old keys remain for a period of time. To address these keys, some embodiments schedule regular vacuuming jobs, which will (1) move items from old keys to current keys (rewrapping their self key with the current class key), and/or (2) delete old, unused keys.

In some embodiments, item updating requires the device to be unlocked, at least to a level that allows current class key access. Also, some embodiments do not delete an old key when there is a single item remaining wrapped under this key in the key hierarchy. In some embodiments, each device randomly schedules its vacuuming in order to smooth out the load on the synchronizing server set.

Individual data items typically exist entirely on their own, and do not interact with other items. When adding or modifying an item, the synchronization layer in some embodiments (1) encrypts the item with the current class key, and (2) uploads the item with a reference to the class key used and sets the current key's reference to the class key used. Transaction failure due to key mismatch kicks off a fetch new class key. This may have to wait for device to unlock. It then builds new key hierarchy and restarts the upload.

Transaction can also fail if the item already exists. This occurs when another device created a new item that conflict with a local item. These two items would have different UUIDs. Upon trying to add the "new" item one (or both) of the devices will choose an item to keep. This is the only time that an item interacts with another item's state in the synchronization system. The one with the earlier UUID by standard sorting will be kept, and the other will be scheduled for deletion. If both sides do this at the same time, the conflicting item should be properly deleted and both should end up in the "in sync" state.

Item modification is similar to item addition, but has to account for transaction failures due to item already having been updated or deleted. The version of data in synchronizing server set is definitive. In the case of a single device updating the synchronizing server set, the device will never run into any data conflicts, and so will always remain in sync. Also, no data conflicts will be generated in cases with a set of peer devices but only a single device ever updates the synchronizing server set.

However, when multiple peer devices perform updates, they can provide conflicting updates to a data item. To understand how some embodiments solve such conflicting updates, the queuing system that is used in some embodiments should first be described. To disconnect data item synchronizing API calls from network operations, some embodiments use a queue system, involving multiple extra database tables (e.g., SQLite table): OutgoingQueue, Mirror, and IncomingQueue. In some embodiments, the OutgoingQueue table contains local updates that are waiting to be synchronized with the server set, the Mirror table contains a local cache for what is stored in the synchronizing server set, and the IncomingQueue table contains the updates from the server set that have to be made to the data item storage. This structure allows the peer device to perform synchronizing operations with the serve set even when the device is locked, and decouples synchronizing operations from synchronous API calls.

Under this structure, some embodiments segment synchronizing operations into several steps. For instance, when any modification is made through an API, a record is added to the OutgoingQueue table. Because the API is being used to change an item record, the device is unlocked, and the encryption of the record can be performed. At no other time are records added to the OutgoingQueue table in some embodiments. In some embodiments, a peer device waits for writes to stack up to the Outgoing Queue table, before sending them to the server set on a schedule or after a threshold quantity has been built up, in order to reduce the amount of transactional overhead in communicating with the server set.

At any point, when there are records in the OutgoingQueue table, a security daemon, security, can pick up the record and submit it to server set. The record will be modified to record an in-flight request. When the security daemon receives a notification from the server set that a record has changed, it will (as a transaction) perform the following. First, the security daemon inserts the new record/ updates the record in the Mirror table. If this update matches a record in the OutgoingQueue table, that record will be deleted from the OutgoingQueue table. If this update does not match a record in the OutgoingQueue table, the update will be added to the IncomingQueue table. Other than during these step, at no other time will records be deleted from the OutgoingQueue table, or added/modified/deleted from the Mirror table, or added to the IncomingQueue table. All of the above-described steps can be done at any time, including when the device is locked.

When there is a record in the IncomingQueue table, and the device is unlocked, then security daemon can perform the steps necessary to insert it into the normal item tables. During this step, the security daemon needs to check for a corresponding update in the OutgoingQueue table. If it finds one, it has detected a merge conflict.

In the above mentioned data-item merging strategy, there are two places where data conflicts can occur. These are: when performing an update to the server set from the OutgoingQueue table, and when performing an update from server set in the IncomingQueue table. The conflicts that are due to updating the server set from the OutgoingQueue table manifest as failed server-set transaction. Generally speaking, whatever item a particular peer device was trying to update has already been updated by another peer device and the particular peer device has not yet processed the update. To resolve, the particular peer device completely replace its local item with the new version in the server set. The particular peer device would discard its local item update, and start fetching the changed data item set from the server.

The IncomingQueue table conflicts manifest as failures to commit changes to the local database, or detecting that updates have occurred to the local database that mean the server-set updates (i.e., the updated data items from the server set) no longer applies. This would be the case when the data items were locally deleted item, updated locally, etc. When the server set has an update and the peer device has a local update (or deletion, etc.), the peer device applies the server set operation. To resolve a case where a new server set UUID-item conflicts primary-key-wise with a local item, some embodiments delete whichever item in server set has the higher UUID. Some embodiments compare two UUIDs by treating the UUID bit strings as numbers.

In some cases, a particular peer device notices that the item that just caused a conflict has attributes that it did not know. This is especially bad is the case where the item with which it is colliding also has extra options from the future. Some embodiments have the particular device picks one item arbitrarily. Other embodiments have the particular device drop the update, and wait for another peer device to resolve the conflict. Another peer device exists because another peer device created this conflicting item.

The server set in some embodiments performs several types of integrity checks. For instance, the server set checks that each data items has a wrapping key. Also, the server set deletes item key record when there are not data item records that chain to it. This deletion can be part of one transaction that deletes all the data Item records that used the key. The server set also detects and mitigates synchronization storms (large number of synchronization transactions) emanating from one or more peers. The server set in some embodiments enforces backoffs/item bans for misbehaving peer devices.

Figure 17:
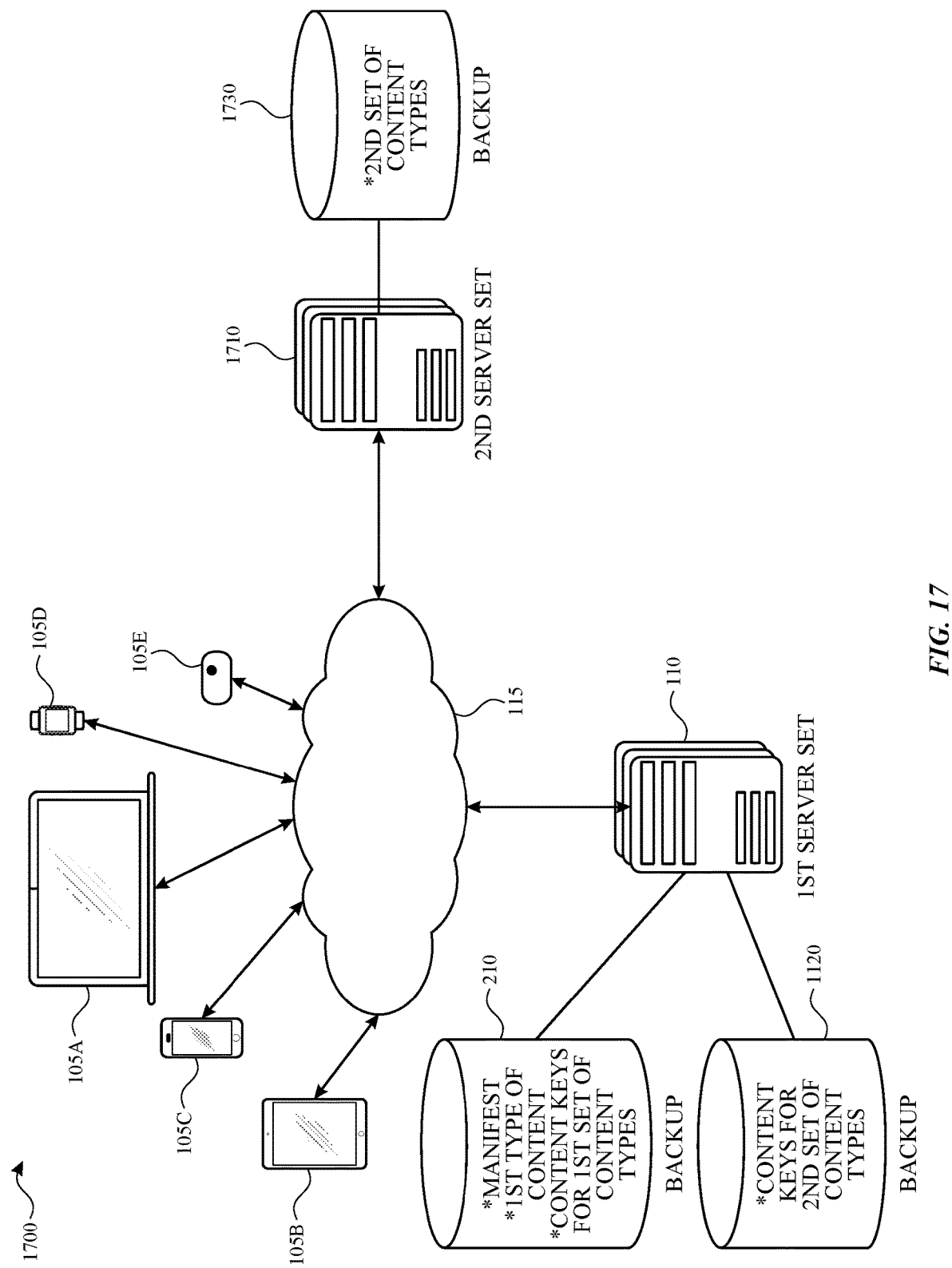
FIG. 17 illustrates an alternative content synchronizing system of some embodiments.

FIG. 17 illustrates an alternative content synchronizing system 1700 of some embodiments. Like the synchronization system 100 of FIG. 1, the system 1700 can synchronize across a wide variety of device (such as a computer 105a, a tablet 105b, a smartphone 105c, a smart watch 105d, and a streaming device 105e) by using a synchronizing server set 110 that connects to these devices through a network 115.

Also, as in synchronization system 100, the synchronizing server set 110 has a backup storage 210 in which it stores backup copies of manifests, encrypted content items and encrypted content keys.

However, in FIG. 17, the synchronizing server set 110 only stores backup copies of a first set of content types (e.g., keys, passwords, certification, secure notes, etc.). For a second set of content types (e.g., device learned behaviors, such as common-typed search strings, device locations, new reading preferences, messages, etc.), the synchronizing server set 110 in some embodiments only stores encrypted content keys in case the devices discard or corrupt the encrypted content keys that the system 1700 distributed with the encrypted content to these devices.

In some embodiments, the content synchronizing system 1700 does not store backup copies of the second set of content types. In other embodiments, the system 1700 has a second set of servers 1710 that store backup copies of the second set of content types. The second set of servers 1710 stores the backup copies in a highly-secured manner that only allows the authorized peer devices to retrieve them. In some of these embodiments, the second set of servers will delete a back copy of a content item if more than a specified number of attempts to retrieve them fail for providing incorrect authentication data.

In some embodiments, the devices send the content items that they want to be distributed to their peer devices in containers. Each container can include one or more sets of encrypted content items for distribution. Also, each container specifies whether the content items within it belong to the first set of content types or the second set of content types. Based on this designation, the synchronizing server set 110 then determines whether it should store backup copies of the content items in the containers.

Figure 18:
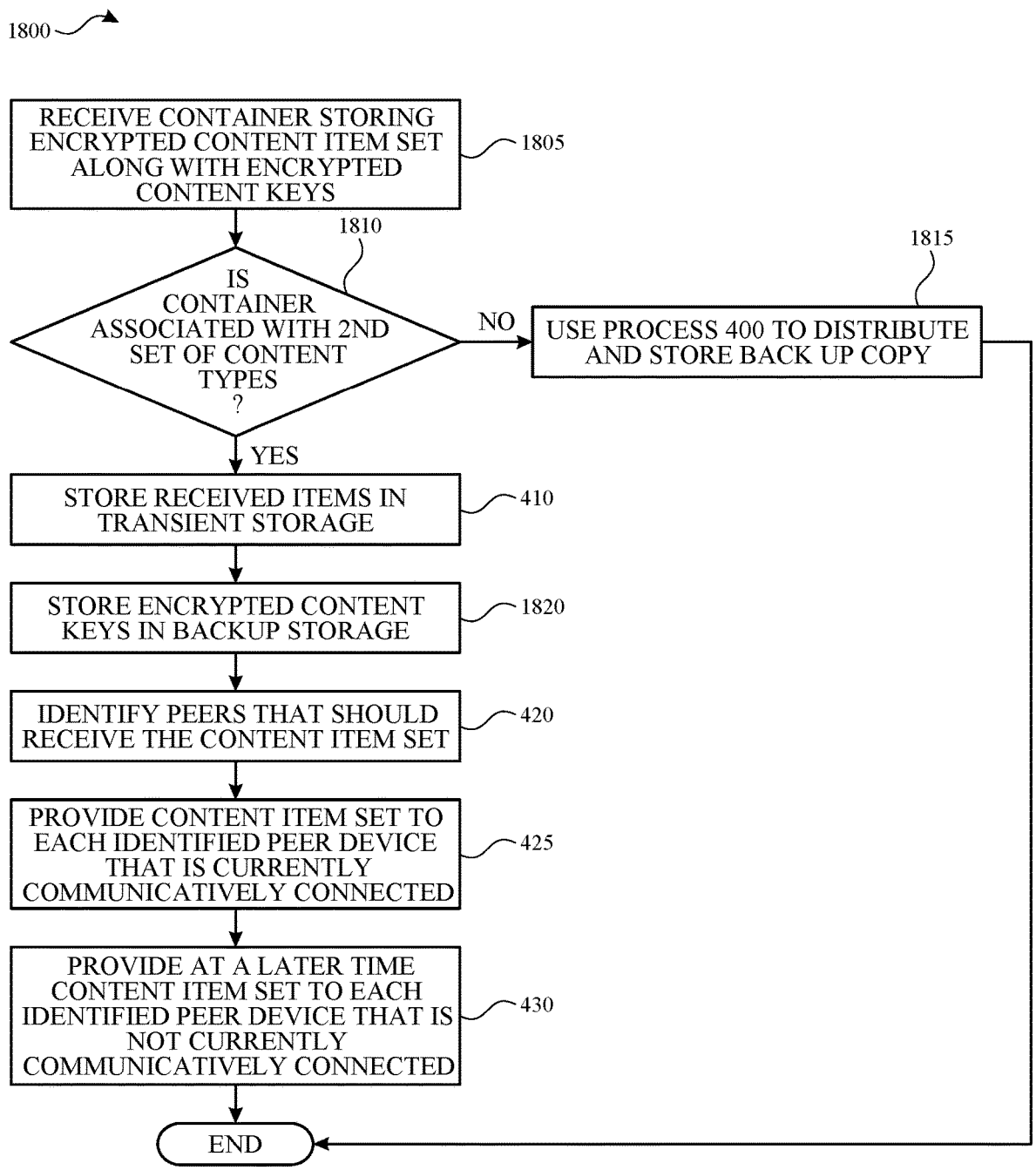
FIG. 18 illustrates a process that the synchronizing server set performs in some embodiments.

FIG. 18 illustrates a process 1800 that the synchronizing server set 110 of the synchronizing system 1700 performs in some embodiments. As shown, the process 1800 starts (at 1805) when the server set 110 receives a container to distribute to other peer devices from one peer device in a peer group. At 1810, the server set 110 initially determines whether the received container is associated with the second set of content types (i.e., whether it includes content items that should not be stored in the backup storage 210 of the server set 110). If not, the process transitions to 1815, where it performs the operations 410-420 of the process 400 that were described above by reference to FIG. 4 and then ends.

On the other hand, when the server set 110 determines that the received container is associated with the second set of content types, it performs operations 410, 1820, 420, 425 and 430. Operations 410, 420, 425 and 430 relate to the server set's distribution of the content items, and are similar to the similarly described operations of the process 400 of FIG. 4. Operation 1820 relates to the backup operation of the server set. Unlike the backup operation 420 of the process 400, the backup operation 1820 only stores backup copies of the encrypted content keys and not the encrypted content items. This is because the encrypted content items that belong to the second set of content types do not get stored in the cloud in some embodiments, or get stored on the backup storage 1730 of the second server set 1710 in other embodiments.

In some embodiments, the devices distribute the content items that belong to the second set of content types without distributing version manifests. In place of the version manifest, some embodiments have the devices sign the content items, or the metadata of the content items, in order to authenticate the source of the content items and thereby to prevent third parties from injecting fake content items into the data that is being synchronized between the peer devices.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software programs can be implemented as sub-parts of a larger program while remaining distinct software programs. In some embodiments, multiple software programs can also be implemented as separate programs.

Finally, any combination of separate programs that together implement a software program described here is within the scope of the subject system. In some embodiments, the software programs, when installed to operate on one or more electronic systems, define one or more specific machine implementations that execute and perform the operations of the software programs.

Figure 19:
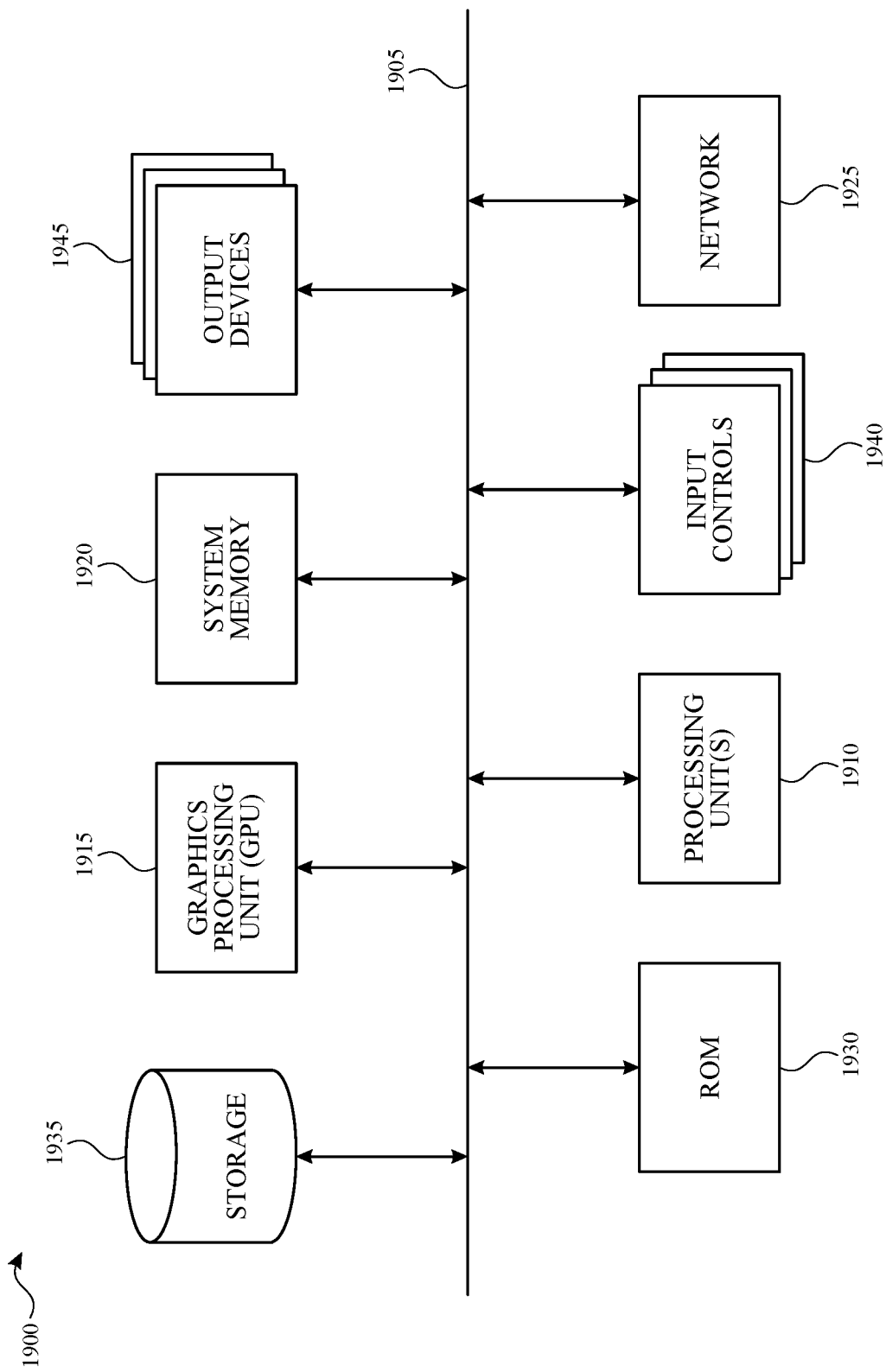
FIG. 19 conceptually illustrates an electronic system with which some embodiments of the subject technology are implemented.

FIG. 19 conceptually illustrates an electronic system 1900 with which some embodiments of the subject technology are implemented. The electronic system 1900 may be a computer (e.g., a desktop computer, personal computer, tablet computer, etc.), phone, or any other sort of electronic or computing device. Such an electronic system includes various types of computer readable media and interfaces for various other types of computer readable media. Electronic system 1900 includes a bus 1905, processing unit(s) 1910, a graphics processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the GPU 1915, the system memory 1920, and the permanent storage device 1935.

From these various memory units, the processing unit(s) 1910 retrieves instructions to execute and data to process in order to execute the processes of the subject technology. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the subject technology use a mass-storage device (such as a magnetic or optical disk and its corresponding disk drive) as the permanent storage device 1935.

Other embodiments use a removable storage device (such as a floppy disk, flash memory device, etc., and its corresponding drive) as the permanent storage device. Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor needs at runtime. In some embodiments, the subject technology's processes are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the subject technology.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the subject technology has been described with reference to numerous specific details, one of ordinary skill in the art will recognize that the subject technology can be embodied in other specific forms without departing from the spirit of the subject technology. In addition, a number of the figures (including FIGS. 3, 4, 7 and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the subject technology is not to be limited by the foregoing illustrative details, but rather is to be defined by the appended claims.

As described above, one aspect of the present technology is the gathering and use of data available from various sources to improve the synchronizing content of users. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
    from a first device of a group of N peer devices, receiving an encrypted first content item and a first set of N−1 encrypted content keys, each encrypted content key in the first set encrypted with a public key of one of the other N−1 peer devices in the group, the encrypted first content item comprising a first indication that the first content item has a first content type;
    based on the first indication that the first content item has the first content type, distributing the encrypted first content item and one encrypted content key in the first set to each of the other N−1 peer devices, and storing a backup copy of the encrypted first content item;
    from the first device of the group, receiving an encrypted second content item and a second set of N−1 encrypted content keys, each encrypted content key in the second set encrypted with a public key of one of the other N−1 peer devices in the group, the encrypted second content item comprising a second indication that the second content item has a second content type; and
    based on the second indication that the second content item has the second content type, distributing the encrypted second content item and one encrypted content key in the second set to each of the other N−1 peer devices, without storing the backup copy of the encrypted second content item.

2. The method of claim 1, wherein the method is implemented by a first set of one or more synchronization computers, wherein a second set of one or more synchronization computers stores the backup copy of the encrypted second content item.

3. The method of claim 2, wherein the second set of synchronization computers provide a more secure content synchronization process than the first set of synchronization computers as the second set of synchronization computers execute a set of security protocols not executed by the first set of synchronization computers.

4. The method of claim 1, wherein the second content type includes content items that are more confidential than the first content type.

5. The method of claim 1 further comprising storing a backup copy of both the first and second sets of encrypted content keys.

6. The method of claim 5 further comprising:
receiving an Nth encrypted content key that is generated by using the public key of the first device; and
storing the Nth encrypted content key as a backup for the first device.

7. The method of claim 1,
wherein the first set of encrypted content keys comprises a plurality of different encryptions of a first content key, while the second set of encrypted content keys comprises a plurality of different encryptions of a second content key; and
wherein the first content key and the second content key are keys for each peer device to use to decrypt respectively the first content item and the second content item after decrypting the encrypted first and second keys with a private key of the peer device.

8. The method of claim 7, wherein the first or second content key is a symmetric key that is used both to encrypt a content item and to decrypt the content item.

9. The method of claim 7, wherein the first or second content key is a highest-level content key that is stored on the first device for first or second content item.

10. The method of claim 7, wherein the peer devices are associated with one account.

11. A non-transitory machine readable medium storing a program for execution by at least one processing unit, the program comprising sets of instructions for:
from a first device of a group of N peer devices, receiving an encrypted first content item and a first set of N−1 encrypted content keys, each encrypted content key in the first set encrypted with a public key of one of the other N−1 peer devices in the group, the encrypted first content item comprising a first indication that the first content item has a first content type;
based on the first indication that the first content item has the first content type, distributing the encrypted first content item and one encrypted content key in the first set to each of the other N−1 peer devices, and storing a backup copy of the encrypted first content item;
from the first device of the group, receiving an encrypted second content item and a second set of N−1 encrypted content keys, each encrypted content key in the second set encrypted with a public key of one of the other N−1 peer devices in the group, the encrypted second content item comprising a second indication that the second content item has a second content type; and
based on the second indication that the second content item has the second content type, distributing the encrypted second content item and one encrypted content key in the second set to each of the other N−1 peer devices, without storing the backup copy of the encrypted second content item.

12. The non-transitory machine readable medium of claim 11, wherein the program is executed by a computer of a first set of one or more synchronization computers, wherein a second set of one or more synchronization computers stores the backup copy of the encrypted second content item.

13. The non-transitory machine readable medium of claim 12, wherein the second set of synchronization computers provide a more secure content synchronization process than the first set of synchronization computers as the second set of synchronization computers execute a set of security protocols not executed by the first set of synchronization computers.

14. The non-transitory machine readable medium of claim 11, wherein the second content type includes content items that are more confidential than the first content type.

15. The non-transitory machine readable medium of claim 11, wherein the program further comprises a set of instructions for storing a backup copy of both the first and second sets of encrypted content keys.

16. The non-transitory machine readable medium of claim 15, wherein the program further comprises sets of instructions for:
receiving an Nth encrypted content key that is generated by using the public key of the first device; and
storing the Nth encrypted content key as a backup for the first device.

17. The non-transitory machine readable medium of claim 11,
wherein the first set of encrypted content keys comprises a plurality of different encryptions of a first content key, while the second set of encrypted content keys comprises a plurality of different encryptions of a second content key; and
wherein the first content key and the second content key are keys for each peer device to use to decrypt respectively the first content item and the second content item after decrypting the encrypted first and second keys with a private key of the peer device.

18. The non-transitory machine readable medium of claim 17, wherein the first or second content key is a highest-level content key that is stored on the first device for first or second content item.

19. The non-transitory machine readable medium of claim 11, wherein each content item is part of a content item set, and the program further comprises sets of instructions for:
receiving from the first device a version manifest for each content item, the version manifest of each content item providing a version number identifying an edit version associated with the content item, an identification of each content item in the content item set that is new or modified in the content item set, and a reference to at least one prior version manifest associated with the content item set when such a prior version manifest was previously defined; and
distributing the version manifest to each of the N−1 peer devices along with the encrypted content item and one encrypted content key.

20. A device comprising:
a memory and;
at least one processor configured to:
receive an encrypted first content item and a first set of N−1 encrypted content keys, each encrypted content key in the first set encrypted with a public key of one of the other N−1 peer devices in a group of N peer devices that includes the device, the encrypted first content item comprising a first indication that the first content item has a first content type;

based on the first indication that the first content item has the first content type, distribute the encrypted first content item and one encrypted content key in the first set to each of the other N−1 peer devices, and store a backup copy of the encrypted first content item;

receive an encrypted second content item and a second set of N−1 encrypted content keys, each encrypted content key in the second set encrypted with a public key of one of the other N−1 peer devices in the group, the encrypted second content item comprising a second indication that the second content item has a second content type; and based on the second indication that the second content item has the second content type, distribute the encrypted second content item and one encrypted content key in the second set to each of the other N−1 peer devices, without storing the backup copy of the encrypted second content item.

* * * * *